US012504568B2

(12) United States Patent
Nguyen et al.

(10) Patent No.: US 12,504,568 B2
(45) Date of Patent: Dec. 23, 2025

(54) PHOTOCHROMIC-DICHROIC ARTICLES

(71) Applicant: Transitions Optical, Ltd., Tuam (IE)

(72) Inventors: Henry Nguyen, Largo, FL (US); Cory S. Brown, Pittsburgh, PA (US); Anil Kumar, Murrysville, PA (US); Alan M. Grubb, Pittsburgh, PA (US); Ramaiahgari Reddy, Murrysville, PA (US); Yannian Li, Solon, OH (US)

(73) Assignee: Transitions Optical, Ltd., Tuam (IE)

( * ) Notice: Subject to any disclaimer, the term of this patent is extended or adjusted under 35 U.S.C. 154(b) by 178 days.

(21) Appl. No.: 18/035,961

(22) PCT Filed: Nov. 10, 2020

(86) PCT No.: PCT/EP2020/081620
§ 371 (c)(1),
(2) Date: May 9, 2023

(87) PCT Pub. No.: WO2022/100816
PCT Pub. Date: May 19, 2022

(65) Prior Publication Data
US 2023/0400616 A1 Dec. 14, 2023

(51) Int. Cl.
*G02B 1/111* (2015.01)
*C09K 19/38* (2006.01)
*C09K 19/54* (2006.01)
*G02B 5/20* (2006.01)
*G02B 5/22* (2006.01)
*G02B 5/23* (2006.01)

(52) U.S. Cl.
CPC .............. *G02B 5/23* (2013.01); *C09K 19/38* (2013.01); *C09K 19/54* (2013.01); *G02B 1/111* (2013.01); *G02B 5/208* (2013.01); *G02B 5/223* (2013.01)

(58) Field of Classification Search
CPC .......... G02B 1/111; G02B 5/23; G02B 5/208; G02B 5/223; C09K 19/38; C09K 19/54
See application file for complete search history.

(56) References Cited

U.S. PATENT DOCUMENTS

| 3,361,706 A | 1/1968 | Meriwether |
| 4,931,220 A | 6/1990 | Haynes et al. |
| 5,166,345 A | 11/1992 | Akashi et al. |
| 5,236,958 A | 8/1993 | Miyashita |
| 5,252,742 A | 10/1993 | Miyashita |
| 5,359,085 A | 10/1994 | Wamoto et al. |
| 5,488,119 A | 1/1996 | Fischer-Reimann et al. |
| 5,645,767 A | 7/1997 | Van Gemert |
| 5,658,501 A | 8/1997 | Kumar et al. |
| 5,770,115 A * | 6/1998 | Misura ............... C09K 9/02 252/586 |
| 5,821,287 A | 10/1998 | Hu et al. |
| 5,962,617 A * | 10/1999 | Slagel ................ C08G 18/758 528/61 |
| 6,113,814 A | 9/2000 | Gemert et al. |
| 6,153,126 A | 11/2000 | Kumar |
| 6,175,450 B1 | 1/2001 | Andreani et al. |
| 6,296,785 B1 | 10/2001 | Nelson et al. |
| 6,348,604 B1 | 2/2002 | Nelson et al. |
| 6,353,102 B1 | 3/2002 | Kumar |
| 6,555,028 B2 | 4/2003 | Walters et al. |
| 6,768,581 B1 | 7/2004 | Yip et al. |
| 7,097,303 B2 | 8/2006 | Kumar et al. |
| 7,256,921 B2 | 8/2007 | Kumar et al. |
| 7,342,112 B2 | 3/2008 | Kumar et al. |
| 7,524,540 B2 | 4/2009 | Saito et al. |
| 7,557,206 B2 | 7/2009 | Kumar et al. |
| 7,910,019 B2 | 3/2011 | He et al. |
| 7,910,020 B2 | 3/2011 | He et al. |
| 7,978,391 B2 | 7/2011 | Kumar et al. |
| 8,211,338 B2 | 7/2012 | He et al. |
| 8,349,210 B2 | 1/2013 | Xu et al. |
| 8,512,604 B2 | 8/2013 | Berzon et al. |
| 8,518,546 B2 | 8/2013 | He et al. |
| 8,545,015 B2 | 10/2013 | Kumar et al. |
| 8,545,984 B2 | 10/2013 | He et al. |
| 8,582,192 B2 | 11/2013 | Kumar et al. |
| 8,613,868 B2 | 12/2013 | Dai et al. |
| 8,628,685 B2 | 1/2014 | He et al. |
| 8,698,117 B2 | 4/2014 | He et al. |
| 8,705,160 B2 | 4/2014 | He et al. |
| 9,475,901 B2 | 10/2016 | Saha et al. |
| 9,688,914 B2 | 6/2017 | Roh et al. |
| 2007/0108411 A1 * | 5/2007 | Saito ................. C09K 19/3483 252/299.61 |

(Continued)

FOREIGN PATENT DOCUMENTS

| CN | 103113901 A | 5/2013 |
| CN | 104250556 A | 12/2014 |

(Continued)

OTHER PUBLICATIONS

Bojinov, "Synergistic Efficiency of Combined HALS-UV Absorber Polymerizable Stabilizers", Journal of Applied Polymer Science, 2006, pp. 2408-2415, vol. 102.

*Primary Examiner* — Bijan Ahvazi
(74) *Attorney, Agent, or Firm* — The Webb Law Firm

(57) ABSTRACT

Provided are photochromic optical articles including an optical substrate and an at least partial anisotropic layer disposed on the at least a portion of the surface of the substrate. The anisotropic layer includes an anisotropic polymer; a photochromic-dichroic dye, a photochromic dye, or combination thereof; a mesogenic hindered amine light stabilizer; and a mesogenic antioxidant. Provided are photochromic coated articles including a substrate and an anisotropic coating layer on at least a portion of the surface of the substrate. The anisotropic coating layer is formed from a polymerizable composition including a polymerizable anisotropic material; a photochromic-dichroic dye, a photochromic dye, or combination thereof; a mesogenic hindered amine light stabilizer; and a mesogenic antioxidant.

16 Claims, No Drawings

(56) References Cited

U.S. PATENT DOCUMENTS

| | | | |
|---|---|---|---|
| 2012/0002141 A1 | 1/2012 | Dai et al. | |
| 2012/0003401 A1* | 1/2012 | Xu | C09K 19/3483 |
| | | | 252/299.5 |
| 2012/0021144 A1* | 1/2012 | Dai | C09K 19/2014 |
| | | | 560/72 |
| 2022/0049161 A1 | 2/2022 | Reddy et al. | |

FOREIGN PATENT DOCUMENTS

| | | |
|---|---|---|
| CN | 110872521 A | 3/2020 |
| EP | 1785466 A1 | 5/2007 |
| JP | 200181469 A | 3/2001 |
| JP | 2007137921 A | 6/2007 |
| WO | 9705213 A1 | 2/1997 |
| WO | 0033111 A1 | 6/2000 |
| WO | 2020119877 A1 | 6/2020 |

* cited by examiner

PHOTOCHROMIC-DICHROIC ARTICLES

CROSS-REFERENCE TO RELATED APPLICATION

This application is the United States national phase of International Application No. PCT/EP2020/081620 filed Nov. 10, 2020, the disclosure of which is hereby incorporated by reference in its entirety.

FIELD OF THE INVENTION

The present invention relates to photochromic articles, employing an anisotropic layer comprising an anisotropic polymer, a photochromic-dichroic dye and/or a photochromic dye, a mesogenic hindered amine light stabilizer, and a mesogenic antioxidant.

BACKGROUND

Photochromic coatings, including photochromic-dichroic coatings, for a variety of optical elements is well known. These photochromic coatings have an absorption spectrum for at least visible radiation that varies in response to the absorption of actinic radiation, capable of having a first state and a second state. In response to actinic radiation, the photochromic coating is capable of converting from a first state, for example, a "clear state", to a second state, for example, a "colored state", and reverts back to the first state in response to actinic radiation of substantially the same wavelength(s) as the absorption(s) of the second state. Photochromic coatings can also be thermally reversible, where the coating converts to a first state, for example, a "clear state", to a second state, for example, a "colored state", in response to actinic radiation. Upon exposure to thermal energy, the photochromic coating can revert back from the second "colored state" to the first "clear state".

Photochromic-dichroic materials can be used in photochromic coatings to form coatings that have both photochromic properties, such as, having an absorption spectrum for at least visible radiation that varies in response to actinic radiation, and dichroic properties, such as capable of absorbing one of two orthogonal plane polarized components of at least transmitted radiation more strongly than the other, which also varies in response to actinic radiation. While capable of absorbing one of two orthogonal plane polarized components of transmitted radiation, dichroic materials require a suitable position or arrangement to achieve a net linear polarization. If dichroic compounds are not suitably positioned or arranged, no net linear polarization will be achieved. Thus, compounds having dichroic properties must be suitably positioned or arranged to achieve a net linear polarization and can be aligned through the use of anisotropic materials, such as, liquid crystal materials, such that the long axis of the molecule takes on an orientation that is generally parallel to a common axis.

When photochromic materials and/or photochromic-dichroic materials undergo a change from one state to another state, such as, from a first "clear state" to a second "colored state", the photochromic and/or photochromic-dichroic materials undergo a conformational change from a first conformational change to a second conformational change. The change from a first conformation to a second conformation results in a change in the amount of physical space that the material occupies. Thus, the photochromic and/or photochromic-dichroic materials requires a chemical environment that is sufficiently flexible to allow the compound to transition from the first conformational state to a second conformational state at a rate that is at least sufficient to provide the desired response over an acceptable time frame. Such an environment can be provided by anisotropic materials, such as, liquid crystal materials. Liquid crystal materials, because of their structure, generally are capable of being ordered and aligned, such as, through the interaction with an external force or another structure, so as to take on a general direction.

Prolonged exposure to ultraviolet light or thermal energy can result in the loss of a photochromic and/or photochromic-dichroic material ability to change from a first conformational state to a second conformational state and back to a first conformational state. This loss of ability is believed to be a result of the irreversible decomposition of the photochromic and/or photochromic-dichroic compound and is referred to as fatigue or light fatigue. Prolonged exposure to ultraviolet light can further result in a yellowing of the photochromic and/or photochromic-dichroic coatings. To reduce fatigue and yellowing, photochromic and photochromic-dichroic coatings generally contain additional organic materials, such as, stabilizers (i.e., thermal stabilizers and/or ultraviolet light stabilizers) that limit and/or delay the degradation of the coating composition due to exposure to elevated temperatures and/or ultraviolet light. Including these stabilizers into coatings, such as, photochromic and/or photochromic-dichroic coatings, can disrupt the alignment of anisotropic materials, as well as dichroic materials in photochromic-dichroic coatings.

In view of the foregoing, it would be desirable to provide photochromic and/or photochromic-dichroic coatings, especially those comprising anisotropic materials, that have reduced fatigue and yellowing with minimal or no disruption of the alignment of the anisotropic materials.

SUMMARY

The invention relates to a photochromic optical article. The photochromic optical article comprises an optical substrate. An at least partial anisotropic layer is disposed on at least a portion of the surface of the substrate. The anisotropic layer comprises an anisotropic polymer; a photochromic-dichroic dye, photochromic dye, or combinations thereof; a mesogenic hindered amine light stabilizer; and a mesogenic antioxidant.

The invention relates to a photochromic coated article. The photochromic coated article comprises a substrate. An anisotropic coating layer is disposed on at least a portion of the surface of the substrate. The anisotropic coating layer is formed from a polymerizable composition. The polymerizable composition comprises a polymerizable anisotropic material; a photochromic-dichroic dye, a photochromic dye, or combinations thereof; a mesogenic hindered amine light stabilizer; and a mesogenic antioxidant.

DESCRIPTION OF THE INVENTION

As used herein, the singular form of "a", "an", and "the" include plural referents unless the context clearly dictates otherwise.

Unless otherwise indicated, all ranges or ratios disclosed herein are to be understood to encompass any and all subranges or sub-ratios subsumed therein. For example, a stated range or ratio of "1 to 10" should be considered to include any and all subranges between (and inclusive of) the minimum value of 1 and the maximum value of 10; that is, all subranges or sub-ratios beginning with a minimum value of 1 or more and ending with a maximum value of 10 or less, such as but not limited to, 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about."

As used herein, the term "actinic radiation" means electromagnetic radiation that is capable of causing a response in a material, such as but not limited to, transforming a photochromic material from one form or state to another as will be discussed in further detail herein.

As used herein, the term "photochromic material" includes both thermally reversible and non-thermally reversible (or photo-reversible) photochromic compounds. Generally, although not limiting herein, when two or more photochromic materials are used in conjunction with each other or with a photochromic-dichroic compound (such as those described above), the various materials can be chosen to complement one another to produce a desired color or hue. For example, mixtures of photochromic compounds can be used, as disclosed herein, to attain certain activated colors, such as, a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors.

The photochromic material can comprise any of a variety of organic and inorganic photochromic materials. The photochromic material(s) can include but is not limited to, the following classes of materials: chromenes, e.g., naphthopyrans, benzopyrans, indeno fused naphthopyrans, phenanthropyrans or mixtures thereof; spiropyrans, e.g., spiro(benzindoline)naphthopyrans, spiro(indoline)benzopyrans, spiro(indoline)naphthopyrans, spiro(indoline)quinopyrans and spiro(indoline)pyrans; oxazines, e.g., spiro(indoline)naphthoxazines, spiro(indoline)pyridobenzoxazines, spiro(benzindoline)pyridobenzoxazines, spiro(benzindoline)naphthoxazines and spiro(indoline)benzoxazines; mercury dithizonates, fulgides, fulgimides and mixtures of such photochromic compounds.

Such photochromic materials and complementary photochromic materials are described in U.S. Pat. No. 4,931,220 at column 8, line 52 to column 22, line 40; U.S. Pat. No. 5,645,767 at column 1, line 10 to column 12, line 57; U.S. Pat. No. 5,658,501 at column 1, line 64 to column 13, line 17; U.S. Pat. No. 6,153,126 at column 2, line 18 to column 8, line 60; U.S. Pat. No. 6,296,785 at column 2, line 47 to column 31, line 5; U.S. Pat. No. 6,348,604 at column 3, line 26 to column 17, line 15; and U.S. Pat. No. 6,353,102 at column 1, line 62 to column 11, line 64, the disclosures of the aforementioned patents are incorporated herein by reference. Spiro(indoline)pyrans are also described in the text, *Techniques in Chemistry*, Volume III, "Photochromism", Chapter 3, Glenn H. Brown, Editor, John Wiley and Sons, Inc., New York, 1971.

Suitable photochromic materials also can include polymerizable photochromic materials, such as, polymerizable naphthoxazines disclosed in U.S. Pat. No. 5,166,345 at column 3, line 36 to column 14, line 3; polymerizable spirobenzopyrans disclosed in U.S. Pat. No. 5,236,958 at column 1, line 45 to column 6, line 65; polymerizable spirobenzopyrans and spirobenzothiopyrans disclosed in U.S. Pat. No. 5,252,742 at column 1, line 45 to column 6, line 65; polymerizable fulgides disclosed in U.S. Pat. No. 5,359,085 at column 5, line 25 to column 19, line 55; polymerizable naphthacenediones disclosed in U.S. Pat. No. 5,488,119 at column 1, line 29 to column 7, line 65; polymerizable spirooxazines disclosed in U.S. Pat. No. 5,821,287 at column 3, line 5 to column 11, line 39; polymerizable polyalkoxylated naphthopyrans disclosed in U.S. Pat. No. 6,113,814 at column 2, line 23 to column 23, line 29; and the polymerizable photochromic compounds disclosed in WO97/05213 and in U.S. Pat. No. 6,555,028 at column 1, line 16 to column 24, line 56. The disclosures of the aforementioned patents on polymerizable photochromic materials are incorporated herein by reference.

Other suitable photochromic materials can include organo-metal dithiozonates, e.g., (arylazo)-thioform ic arylhydrazidates, e.g., mercury dithizonates which are described in, for example, U.S. Pat. No. 3,361,706 at column 2, line 27 to column 8, line 43; and fulgides and fulgimides, e.g., the 3-furyl and 3-thienyl fulgides and fulgimides, which are described in U.S. Pat. No. 4,931,220 at column 1, line 39 through column 22, line 41, the disclosures of which are incorporated herein by reference.

As used herein, the term "linearly polarized" or like terms means to confine the vibrations of the electric vector of light waves to one direction or plane.

As used herein, the term "dichroic" means capable of absorbing one of two orthogonal plane polarized components of at least transmitted radiation more strongly than the other. Thus, while dichroic materials are capable of preferentially absorbing one of two orthogonal plane polarized components of transmitted radiation, if the molecules of the dichroic material are not suitably positioned or arranged, no net linear polarization of transmitted radiation will be achieved. That is, due to the random positioning of the molecules of the dichroic material, selective absorption by the individual molecules will cancel each other such that no net or overall linear polarizing effect is achieved. Thus, it is generally necessary to suitably position or arrange the molecules of the dichroic material by alignment with another material in order to achieve a net linear polarization.

As used herein, the term "photochromic-dichroic" and similar terms, such as, "photochromic-dichroic materials", "photochromic-dichroic dyes" and "photochromic-dichroic compounds" means materials, dyes, and compounds that possess and/or provide both photochromic properties (i.e., having an absorption spectrum for at least visible radiation that varies in response to at least actinic radiation), and dichroic properties (i.e., capable of absorbing one of two orthogonal plane polarized components of at least transmitted radiation more strongly than the other) that vary in response to at least actinic radiation. It should be known that a photochromic-dichroic material, photochromic-dichroic dye, or photochromic-dichroic compound can be a single compound possessing and/or providing both photochromic properties and dichroic properties.

As used herein, to modify the term "state," the terms "first" and "second" are not intended to refer to any particular order or chronology, but instead, refer to two different conditions or properties. For purposes of non-limiting illustrations, the first state and the second state of a photochromic compound can differ with respect to at least one optical property, such as but not limited to, the absorption of visible and/or UV radiation. Thus, the photochromic compounds of the present invention can have a different absorption spectrum in each of the first and second states. For example, while not limiting herein, a photochromic compound of the present invention can be clear in the first state and colored in the second state. Alternatively, a photochromic compound of the present invention can have a first color in the first state and a second color in the second state.

As used herein, the term "polymer" means homopolymers (e.g., prepared from a single monomer species), copolymers (e.g., prepared from at least two monomer species), and graft polymers.

As used herein, molecular weight values of polymers, such as, weight average molecular weights (Mw) and number average molecular weights (Mn), are determined by gel permeation chromatography using appropriate standards, such as, polystyrene standards.

As used herein, the term "(meth)acrylate" and similar terms, such as, "(meth)acrylic acid ester" means methacrylates and/or acrylates. For example, unless specified otherwise herein, the term "(meth)acrylic acid" includes methacrylic acid and/or acrylic acid.

As used herein, polydispersity index (PDI) values represent a ratio of the weight average molecular weight (Mw) to the number average molecular weight (Mn) of the polymer (i.e., Mw/Mn).

As used herein, the term "optical" means pertaining to or associated with light and/or vision. For example, as disclosed herein, the optical article or element or device can be chosen from ophthalmic articles, elements and devices, display articles, elements and devices, windows, mirrors, and active and passive liquid crystal cell articles, elements and devices.

As used herein, the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as but not limited to, bifocal lenses, trifocal lenses, and progressive lenses), as well as other elements used to correct, protect, or enhance (cosmetically or otherwise) vision, including, without limitation, contact lenses, intra-ocular lenses, magnifying lenses, and protective lenses or visors.

As used herein, the term "display" means the visible or machine-readable representation of information in words, numbers, symbols, designs, or drawings. Non-limiting examples of display elements include screens, monitors, and security elements, such as, security marks.

As used herein, the term "window" means an aperture adapted to permit the transmission of radiation therethrough. Non-limiting examples of windows include automotive and aircraft transparencies, windshields, filters, shutters, and optical switches.

As used herein, the term "mirror" means a surface that specularly reflects a large fraction of incident light.

As used herein, the term "liquid crystal cell" refers to a structure containing a liquid crystal material that is capable of being ordered. A non-limiting example of a liquid crystal cell element is a liquid crystal display.

As used herein, spatial or directional terms, such as "left", "right", "inner", "outer", "above", "below", and the like, relate to various orientations of the invention as may be described further herein, such as articles and multilayer articles of the present invention. It is to be understood, however, that the invention can assume various alternative orientations to those described herein and, accordingly, such terms are not to be considered as limiting.

As used herein, the terms "formed over", "deposited over", "provided over", "applied over", "residing over", or "positioned over" mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to, issued patents and patent applications, referred to herein, and unless otherwise indicated, are to be considered to be "incorporated by reference" in their entirety.

As used herein, recitations of "optionally substituted" group, means a group, including but not limited to, alkyl group, cycloalkyl group, heterocycloalkyl group, aryl group, and/or heteroaryl group, in which at least one hydrogen thereof has been optionally replaced or substituted with a group that is other than hydrogen, such as but not limited to, halo groups (e.g., F, Cl, I, and Br), hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, hydrocarbyl groups (including, but not limited to: alkyl; alkenyl; alkynyl; cycloalkyl, including poly-fused-ring cycloalkyl and polycyclocalkyl; heterocycloalkyl; aryl, including hydroxyl substituted aryl, such as, phenol, and including poly-fused-ring aryl; heteroaryl, including poly-fused-ring heteroaryl; and aralkyl groups), and amine groups, such as —N($R_{14}'$)($R_{15}'$) where $R_{14}'$ and $R_{15}'$ are each independently hydrogen, linear or branched $C_1$-$C_{20}$ alkyl, $C_3$-$C_{12}$ cycloakyl, $C_3$-$C_{12}$ heterocycloalkyl, aryl, or heteroaryl.

As used herein, unless otherwise indicated, left-to-right representations of linking groups, such as, divalent linking groups, are inclusive of other appropriate orientations, such as but not limited to, right-to-left orientations. For purposes of non-limiting illustration, the left-to-right representation of the divalent linking group

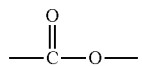

or equivalently —C(O)O—, is inclusive of the right-to-left representation thereof,

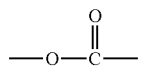

or equivalently —O(O)C— or —OC(O)—.

As used herein, the term "alkyl" and related terms, such as, "alkyl group(s)" means groups which include at least one carbon atom, such as, 1 to 20 carbon atoms, such as, $C_1$-$C_{20}$ alkyl groups, or $C_1$-$C_{10}$ alkyl groups, or $C_1$-$C_6$ alkyl groups; are linear or branched; and are saturated (and, correspondingly, are free of alkene groups and alkyne groups). Examples of alkyl groups include, but are not limited to, methyl, ethyl, n-propyl, iso-propyl, n-butyl, iso-butyl, sec-butyl, t-butyl, linear or branched pentyl, linear or branched hexyl, linear or branched heptyl, linear or branched octyl, linear or branched nonyl, linear or branched decyl, linear or branched undencyl, linear or branched dodecyl, linear or branched tridecyl, linear or branched tetradecyl, linear or branched pentadecyl, linear or branched hexadecyl, linear or branched heptadecyl, linear or branched octadecyl, linear or branched nonadecyl, and linear or branched eicosanyl.

As used herein, recitations of "linear or branched" groups, such as, linear or branched alkyl, are herein understood to include: a methylene group or a methyl group; groups that are linear, such as, linear $C_2$-$C_{20}$ alkyl groups; and groups that are appropriately branched, such as, branched $C_3$-$C_{20}$ alkyl groups.

As used herein, the term "cycloalkyl" as used herein, means groups that are appropriately cyclic, such as but not limited to, $C_3$-$C_{12}$ cycloalkyl (including, but not limited to, cyclic $C_5$-$C_7$ alkyl) groups. Examples of cycloalkyl groups include cyclopropyl, cyclobutyl, cyclopentyl, cyclohexyl, and cyclooctyl groups. The term "cycloalkyl" as used herein also includes: bridged ring polycycloalkyl groups (or bridged ring polycyclic alkyl groups), such as but not limited to, bicyclo[2.2.1]heptyl (or norbornyl) and bicyclo[2.2.2]octyl; and fused ring polycycloalkyl groups (or fused ring polycyclic alkyl groups), such as but not limited to, octahydro-1H-indenyl, and decahydronaphthalenyl.

The term "heterocycloalkyl" as used herein, means groups that are appropriately cyclic, such as but not limited to, $C_3$-$C_{12}$ heterocycloalkyl groups or $C_5$-$C_7$ heterocycloalkyl groups, and which have at least one hetero atom in the cyclic ring, such as but not limited to, O, S, N, P, and combinations thereof. Examples of heterocycloalkyl groups include, but are not limited to, tetrahydrofuranyl, tetrahydropyranyl, and piperidinyl. The term "heterocycloalkyl" as used herein, also includes: bridged ring polycyclic heterocycloalkyl groups, such as but not limited to, 7-oxabicyclo[2.2.1]heptanyl; and fused ring polycyclic heterocycloalkyl groups, such as but not limited to, octahydrocyclopenta[b]pyranyl, and octahydro-1H-isochromenyl.

As used herein, the term "alkynyl" and related terms, such as "alkynyl group(s)" means groups which include at least two carbon atoms, such as, 2 to 20 carbon atoms, such as, $C_2$-$C_{20}$ alkynyl groups, or $C_2$-$C_{10}$ alkynyl groups, or $C_2$-$C_6$ alkynyl groups; are linear or branched; and include one or more interior and/or terminal alkyne (or alkynyl) groups. Examples of alkynyl groups include, but are not limited to, ethynyl, propynyl, butynyl, linear or branched pentynyl, linear or branched hexynyl, etc.

As used herein, the term "heteroaryl" and related terms, such as "heteroaryl group(s)" means cyclic aromatic groups, which include at least 3 carbon atoms, such as, $C_3$-$C_{20}$ heteroaryl groups, or $C_5$-$C_{14}$ heteroaryl groups; at least one heteroatom in the aromatic ring, such as —O—, —N—, and/or —S—; and, optionally, include at least two fused rings, at least one of which is a fused heteroaromatic ring. Examples of heteroaryl groups include, but are not limited to, pyrazolyl, imidazolyl, triazinyl, furanyl, thiophenyl, pyranyl, pyridinyl, isoquinolinyl, and pyrimidinyl.

As used herein, the term "alkoxy" and related terms, such as "alkoxy group(s)" means a group represented by —OR, where R is a linear or branched alkyl group which includes at least one carbon atom, such as, 1 to 20 carbon atoms, such as, $C_1$-$C_{20}$ alkyl, or $C_1$-$C_{10}$ alkyl, or $C_1$-$C_6$ alkyl, and, correspondingly, the alkoxy group is, for example, $C_1$-$C_{20}$ alkoxy, or $C_1$-$C_{10}$ alkoxy, or $C_1$-$C_6$ alkoxy. Examples of alkoxy groups include, but are not limited to, those examples of alkyl groups recited previously herein, which include a terminal divalent oxygen linkage or group (or terminal ether linkage or group), such as but not limited to, methoxy ($CH_3$—O—), ethoxy ($CH_3CH_2$—O—), n-propoxy ($CH_3CH_2CH_2$—O—), iso-propoxy, linear or branched butoxy, linear or branched pentoxy, linear or branched hexoxy, etc.

As used herein, the term "halogen" and related terms, such as "halogen group(s)" and/or "halo group(s)" means a single bonded halogen atom, such as, fluoro (F), chloro (Cl), bromo (Br), and/or iodo (I).

As used herein, the term "amino" and related terms, such as, "amino group", includes groups represented by —N($R^{14}$)($R^{15}$), where $R^{14}$ and $R^{15}$ are each independently selected, for example, from hydrogen, aliphatic groups, cycloaliphatic groups, heterocycloaliphatic groups, aryl groups, and heteroaryl groups. As used herein, the term "primary amino" and related terms, such as, "primary amino group" means a group represented by —$NH_2$.

As used herein, and unless otherwise explicitly stated, the term "hydrogen" and related terms, such as, "hydrogen group(s)" means a single bonded hydrogen (—H).

As used herein, the term "alkenyl" and related terms, such as, "alkenyl groups" means groups which include at least two carbon atoms, such as, 2 to 20 carbon atoms, such as, $C_2$-$C_{20}$ alkenyl groups, or $C_2$-$C_{10}$ alkenyl groups, or $C_2$-$C_6$ alkenyl groups; are linear or branched; and include one or more interior and/or terminal alkene (or alkenyl) groups. Examples of alkenyl groups include, but are not limited to, those examples of linear or branched alkyl groups recited previously herein, which have at least two carbon atoms and at least one alkene (or alkenyl) group, such as but not limited to, vinyl, linear or branched propenyl, linear or branched butenyl, linear or branched pentenyl, linear or branched hexenyl, etc.

As used herein, the term "aryl" and related terms, such as, "aryl group(s)" means cyclic aromatic groups, which include at least 6 carbon atoms, such as, $C_6$-$C_{20}$ aryl groups, or $C_6$-$C_{14}$ aryl groups; and, optionally, include at least two fused rings, at least one of which is a fused aromatic ring. Examples of aryl groups include, but are not limited to, phenyl, naphthalenyl, anthracenyl, phenanthrenyl, triphenylenyl, 9,10-dihydroanthracenyl, 9,10-dihydrophenanthrenyl, and triptycenyl.

As used herein, the term "aralkyl" or "arylalkyl" means an aryl-alkyl group in which the aryl and alkyl are as previously described. The bond to the parent moiety is through the alkyl. Non-limiting examples of suitable aralkyl groups include, but are not limited to, benzyl and phenethyl.

A photochromic optical article of the present invention includes an optical substrate. The photochromic optical article further includes an at least partial anisotropic layer disposed on the at least a portion of the surface of the optical substrate. The at least partial anisotropic layer of the photochromic optical article includes an anisotropic polymer, a photochromic-dichroic dye, a photochromic dye, or combinations thereof, a mesogenic hindered amine light stabilizer, and a mesogenic antioxidant. The photochromic optical article includes other optional layers, which will be described further herein.

As used herein the term "anisotropic" means having at least one property that differs in value when measured in at least one different direction. Accordingly, "anisotropic materials" are materials that have at least one property that differs in value when measured in at least one different direction. Non-limiting examples of polymerizable anisotropic materials that can be included in the anisotropic layer, but are not limited to, those liquid crystal monomers as described further herein with regard to the optional alignment layer of the photochromic optical articles of the present invention.

The anisotropic layer includes an anisotropic polymer, formed from polymerizable anisotropic materials, such as, liquid crystal monomers and/or oligomers as disclosed in Table 1 of U.S. Pat. No. 7,910,019 B2 at columns 43-90 thereof, which disclosure is incorporated herein by reference. Suitable commercially available polymerizable liquid crystal monomers include those available from Merck KGaA (Darmstadt, Germany) under the tradename licrivue®reactive mesogens. Examples thereof include, but are not limited to, RM-23, RM-82, RM-105, and RM-257. The polymerizable liquid crystal monomers can be bimesogen-containing reactive liquid crystal monomers, such as, those disclosed in Examples 12, 24-34, and CE-41 of International Patent Application Publication No. WO 2020/119877.

Examples of photochromic-dichroic dyes suitable for use in for the anisotropic layer of the photochromic optical article of the present invention can include, but are not limited, to those described in detail in U.S. Pat. No. 7,342,112 at column 5, line 12 to column 78, line 13, the disclosure of which is incorporated herein by reference.

The photochromic-dichroic dye and/or the photochromic dye generally are present in the anisotropic layer in an amount at least sufficient so as to provide an article prepared from the composition with a desirable level of photochromic properties, which is referred to as a photochromic amount. When used, the amount of photochromic-dichroic dye(s) present in the anisotropic layer can range from 0.1 percent by weight to 40 percent by weight, or 1 percent by weight to 30 percent by weight, or 5 percent by weight to 20 percent by weight by weight, or 10 percent by weight to 15 percent by weight, based on the weight sum of the anisotropic polymer, photochromic dye, and photochromic-dichroic dyes in the anisotropic layer.

The anisotropic layer of the photochromic optical article further comprises a mesogenic hindered amine light stabilizer. The mesogenic hindered amine light stabilizer is a compound represented by the following Formula (I):

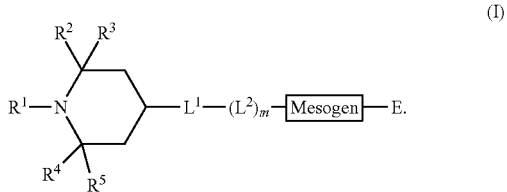
(I)

The mesogenic hindered amine light stabilizer compounds suitable for preparing the photochromic optical article of the present invention, for example, as represented by Formula (I), and the various groups thereof will be described in further detail herein as follows.

$R^1$ of the mesogenic hindered amine light stabilizer compound of Formula (I) is hydrogen, alkyl, alkoxy, acetyl, hydroxyl, or oxide. In some examples, $R^1$ of the mesogenic hindered amine light stabilizer compound of Formula (I) is hydrogen, alkyl, or alkoxy.

$R^2$, $R^3$, $R^4$ and $R^5$ of the mesogenic hindered amine light stabilizer compound of Formula (I) are each independently hydrogen or alkyl, provided that two or more of $R^2$, $R^3$, $R^4$ and $R^5$ are alkyl. In some examples, $R^2$, $R^3$, $R^4$, and $R^5$ of the mesogenic hindered amine light stabilizer compound of Formula (I) are each alkyl.

The divalent linking group $L^1$ of the mesogenic hindered amine light stabilizer of Formula (I) is a divalent bond, or one of Formulas (IIa), (IIb), (IIc), (IId), (IIe), or (IIf),

(IIa)

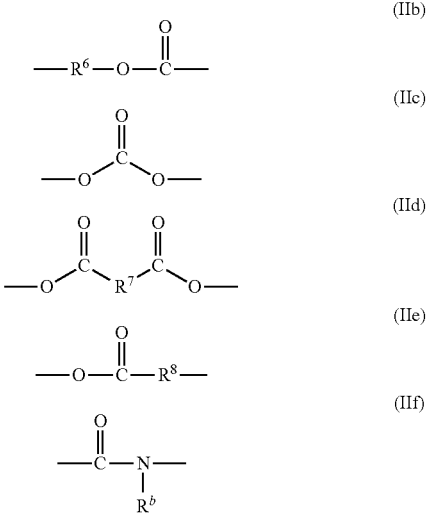

With the divalent linking group represented by Formula (IIb), $R^6$ is a divalent alkyl or a divalent substituted alkyl. With the divalent linking group represented by Formula (IId), $R^7$ is a divalent alkyl or a divalent substituted alkyl. With the divalent linking group represented by Formula (IIe), $R^8$ is a divalent alkyl or a divalent substituted alkyl group. With the divalent linking group represented by Formula (IIf), $R^b$ is hydrogen, alkyl, or substituted alkyl. With the mesogenic hindered amine light stabilizer of Formula (I), m is from 0 to 4.

The $L^2$ segments of the mesogenic hindered amine light stabilizer of Formula (I), is independently for each m a divalent $C_1$-$C_{25}$ alkyl or a divalent $C_2$-$C_{25}$ alkenyl, in each case optionally interrupted with at least one of —O—, —C(O)—, —C(O)O—, or —OC(O)O—.

The mesogen of the mesogenic hindered amine light stabilizer of Formula (I) is represented by the following Formula III:

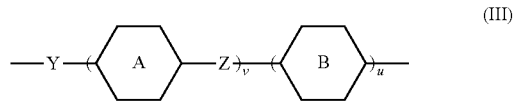
(III)

With the mesogen represented by Formula (III), Y is a divalent linking group which is a divalent bond, —O—, or —S—.

With the mesogen represented by Formula (III), v and u are each independently 0 to 4, provided that the sum of v and u is 2 to 4. In some examples with the mesogen represented by Formula (III), the sum of v and u is 3 to 4.

With the mesogen represented by Formula (III), Z is independently for each v, a divalent linking group which is a divalent bond, —O—, —S—, —C(O), —C(O)O—, —OC(O)O—, —N($R^9$)—C(O)—O—, or —C(O)—N($R^9$)—. With the mesogen represented by Formula (III), $R^9$ is hydrogen, alkyl, or substituted alkyl. In some examples, with the mesogen represented by Formula (III), Z is, independently for each v, a divalent linking group which is a divalent bond or —C(O)O—.

With the mesogen represented by Formula (III), the divalent rings

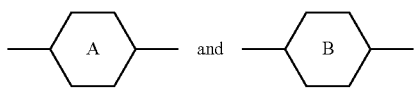

are each independently, for each v (for divalent ring-A) and each u (for divalent ring-B), phenylen-1,4-diyl, substituted phenylen-1,4-diyl, cyclohexan-1,4-diyl, or substituted cyclohexan-1,4-diyl. The optional substituents of divalent ring A and divalent ring B can be alkoxy, alkyl, or halogen.

As used herein, the term "divalent ring-A" means a divalent ring with the following representation:

In addition, as used herein, the term "divalent ring-B" means a divalent ring with the following representation:

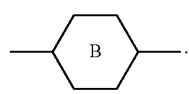

E of the mesogenic hindered amine light stabilizer of Formula (I) is hydrogen, linear or branched $C_1$-$C_{25}$ alkyl, linear or branched $C_2$-$C_{25}$ alkenyl, linear or branched $C_2$-$C_{25}$ alkynyl, each optionally interrupted with at least one of —O—, —S—, —C(O)—, —C(O)O—, or —OC(O)O—. In some examples, E of the mesogenic hindered amine light stabilizer of Formula (I) is alkyl.

When $L^1$ is directly linked to $L^2$ (and equivalently when $L^2$ is linked to $L^1$) for the mesogenic hindered amine light stabilizer of Formula (I), the direct link therebetween (e.g., each direct $L^1$-$L^2$ link) is free of two heteroatoms linked (or bonded) together. When $L^1$ is directly linked to the Mesogen (and equivalently when Mesogen is linked to $L^1$) for the mesogenic hindered amine light stabilizer of Formula (I), the direct link therebetween (e.g., each direct a $L^1$-Mesogen link) between $L^1$ and Y is free of two heteroatoms linked (or bonded) together. When $L^2$ is directly linked to Mesogen (and equivalently when Mesogen is linked to $L^2$) for the mesogenic hindered amine light stabilizer of Formula (I), the direct link therebetween (e.g. each direct $L^2$-Mesogen link) between $L^2$ and Y is free of two heteroatoms linked (or bonded) together.

Mesogenic hindered amine light stabilizers that can be used in the anisotropic layer include, but are not limited to, art-recognized materials, such as, described in U.S. Pat. No. 8,349,210 which disclosure is incorporated herein by reference.

For example, the mesogenic hindered amine light stabilizer for the anisotropic layer can be represented by the following Formulas (IVA) through (IVH):

Formula (IVA)

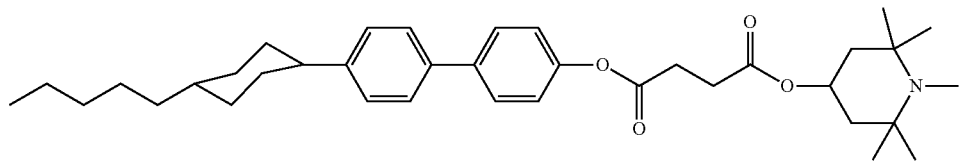

1,2,2,6,6-pentamethylpiperidin-4-yl (4'-(4-pentylcyclohexyl)-[1,1'-biphenyl]-4-yl) succinate, Formula (IVB)

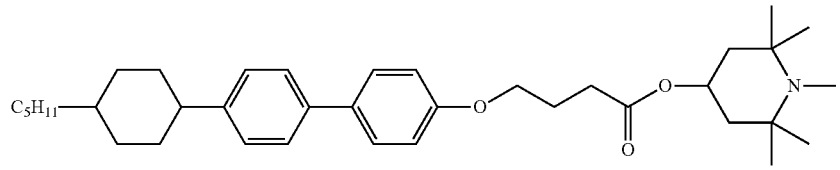

1,2,2,6,6-pentamethylpiperidin-4-yl 4-((4'-(4-pentylcyclohexyl)-[1,1'-biphenyl]-4-yl)oxy)butanoate, Formula (IVC)

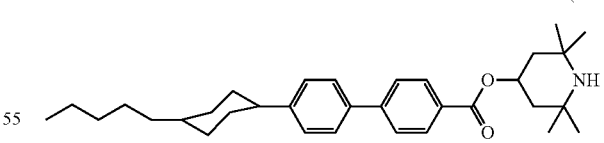

2,2,6,6-tetramethylpiperidin-4-yl 4'-(4-pentylcyclohexyl)-[1,1'-biphenyl]-4-carboxylate, Formula (IVD)

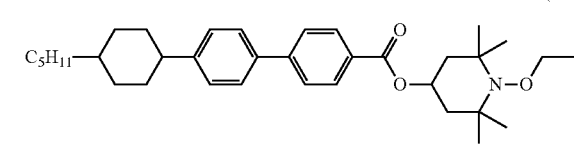

1-ethoxy-2,2,6,6-tetramethylpiperidin-4-yl 4'-(4-pentylcyclohexyl)-[1,1'-biphenyl]-4-carboxylate,

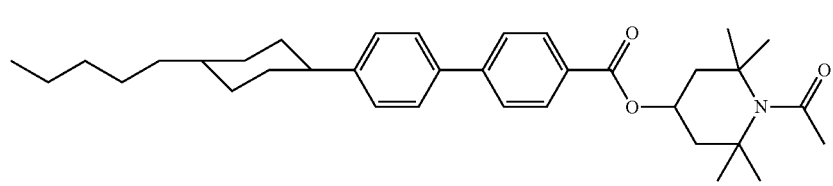

Formula (IVE)

1-acetyl-2,2,6,6-tetramethylpiperidin-4-yl 4'-((1s,4r)-4-pentylcyclohexyl)-[1,1'-biphenyl]-4-carboxylate,

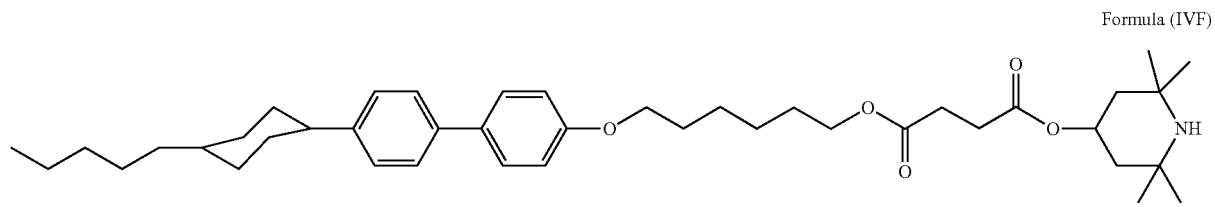 [SMILES: CCCCCC1CCC(c2ccc(-c3ccc(OCCCCCCOC(=O)CCC(=O)OC4CC(C)(C)NC(C)(C)C4)cc3)cc2)CC1]

Formula (IVF)

6-((4'-(4-pentylcyclohexyl)-[1,1'-biphenyl]-4-yl)oxy)hexyl (2,2,6,6-tetramethylpiperidin-4-yl) succinate,

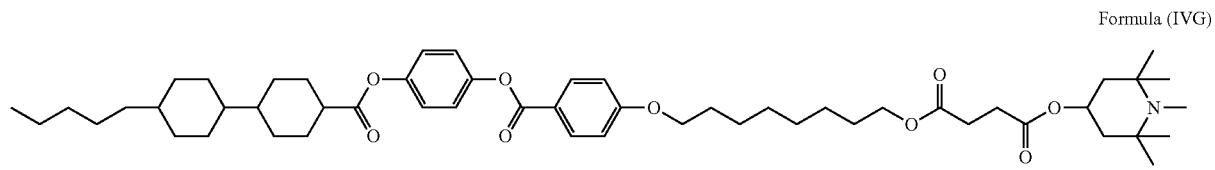 [SMILES: CCCCCC1CCC(C2CCC(C(=O)Oc3ccc(OC(=O)c4ccc(OCCCCCCCCOC(=O)CCC(=O)OC5CC(C)(C)N(C)C(C)(C)C5)cc4)cc3)CC2)CC1]

Formula (IVG)

1,2,2,6,6-pentamethylpiperidin-4-yl (8-(4-((4-((4'-pentyl-[1,1'-bi(cyclohexane)]-4-carbonyl)oxy)phenoxy)carbonyl)phenoxy)octyl) succinate, and

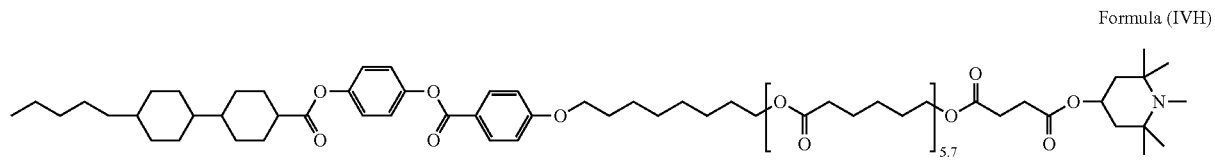

Formula (IVH)

6,13,20,27,34,41-hexaoxo-50-(4-((4-((4'-pentyl-[1,1'-bi(cyclohexane)]-4-carbonyl)oxy)phenoxy)carbonyl)phenoxy)-7,14,21,28,35,42-hexaoxapentacontyl (1,2,2,6,6-pentamethylpiperidin-4-yl) succinate.

The amount of mesogenic hindered amine light stabilizer in the anisotropic layer can range from 10 mole percent to 50 mole percent, relative to the total moles of photochromic-dichroic dye(s) present in the anisotropic layer.

Mesogenic antioxidant compounds suitable for preparing the photochromic optical article of the present invention, for example, as represented by Formula (V), and the various groups thereof will be described in further detail herein as follows.

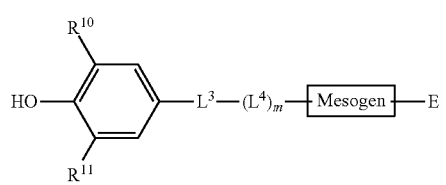

(V)

$R^{10}$ and $R^{11}$ of the mesogenic antioxidant compound of Formula (V) are each independently hydrogen or linear or branched alkyl, provided that at least one of $R^{10}$ and $R^{11}$ is alkyl.

The divalent linking group $L^3$ of the mesogenic antioxidant of Formula (V) is a divalent bond, or one of Formulas (VIa), (VIb), (VIc), (VId), (VIe), or (VIf),

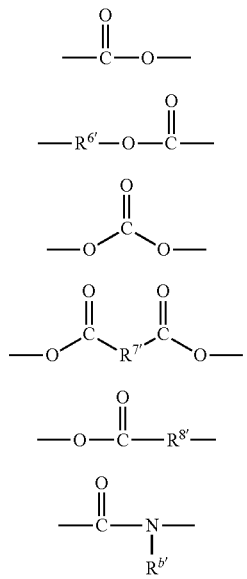

With the divalent linking groups represented by Formulas (VIb), (VId), (VIe), and (VIf), $R^{6'}$, $R^{7'}$, $R^{8'}$, and $R^{b'}$ are each independently $R^6$, $R^7$, $R^8$, and $R^b$, respectively. With the mesogenic antioxidant of Formula (V), m is from 0 to 4.

$L^4$ segments of the mesogenic antioxidant of Formula (V), is independently for each m divalent $C_1$-$C_{25}$ alkyl or divalent $C_2$-$C_{25}$ alkenyl, in each case optionally interrupted with at least one of —O—, —C(O)—, —C(O)O—, or —OC(O)O—.

The mesogen of the mesogenic antioxidant of Formula (V) is represented by Formula (III):

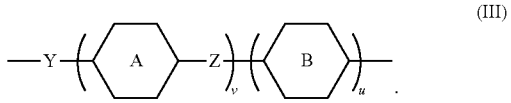

With the mesogen represented by Formula (III), Y is a divalent linking group which is a divalent bond, —O—, or —S—.

With the mesogen represented by Formula (III), v and u are each independently 0 to 4, provided that the sum of v and u is 2 to 4. With the mesogen represented by Formula (III), the sum of v and u is 3 to 4.

With the mesogen represented by Formula (III), Z is independently for each v, a divalent linking group which is a divalent bond, —O—, —S—, —C(O), —C(O)O—, —OC(O)O—, —N($R^9$)—C(O)—O—, or —C(O)—N($R^9$)—. With the mesogen represented by Formula (III), $R^9$ is hydrogen, alkyl, or substituted alkyl. With the mesogen represented by Formula (III), Z is, independently for each v, a divalent linking group which is a divalent bond or —C(O)O—.

With the mesogen represented by Formula (III), the divalent rings

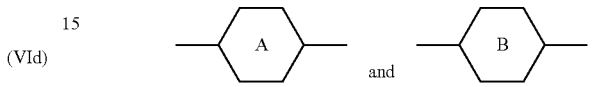

are each independently, for each v (for divalent ring-A) and each u (for divalent ring-B), phenylen-1,4-diyl, or substituted phenylen-1,4-diyl, or cyclohexan-1,4-diyl, or substituted cyclohexan-1,4-diyl. The optional substituents of divalent ring A and divalent ring B can be alkoxy, alkyl, or halogen.

E of the mesogenic antioxidant of Formula (V) is hydrogen, linear or branched $C_1$-$C_{25}$ alkyl, linear or branched $C_2$-$C_{25}$ alkenyl, linear or branched $C_2$-$C_{25}$ alkynyl, each optionally interrupted with at least one of —O—, —S—, —C(O)—, —C(O)O—, or —OC(O)O—. E of the mesogenic antioxidant stabilizer of Formula (V) is alkyl.

When $L^3$ is directly linked to $L^4$ (and equivalently when $L^4$ is linked to $L^3$) for the mesogenic antioxidant stabilizer of Formula (V), the direct link therebetween (e.g., each direct $L^3$-$L^4$ link) is free of two heteroatoms linked (or bonded) together. When $L^3$ is directly linked to the Mesogen (and equivalently when Mesogen is linked to $L^3$) for the mesogenic antioxidant of Formula (V), the direct link therebetween (e.g., each direct a $L^3$-Mesogen link) between $L^3$ and Y is free of two heteroatoms linked (or bonded) together. When $L^4$ is directly linked to Mesogen (and equivalently when Mesogen is linked to $L^4$) for the mesogenic antioxidant of Formula (V), the direct link therebetween (e.g., each direct $L^4$-Mesogen link) between $L^4$ and Y is free of two heteroatoms linked (or bonded) together.

Mesogenic antioxidants that can be used in the anisotropic layer include, but are not limited to, art-recognized materials, such as, described in U.S. Pat. No. 8,613,868 which disclosure is incorporated herein by reference.

For example, the mesogenic antioxidant suitable for the anisotropic layer can be represented by the following Formulas (VIIA) through (VIIG):

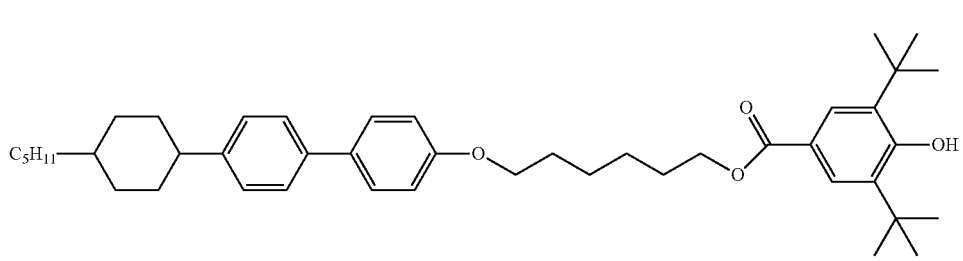

Formula (VIIA)

6-((4'-(4-pentylcyclohexyl)-[1,1'-biphenyl]-4-yl)oxy)hexyl 3,5-di-tert-butyl-4-hydroxybenzoate, Formula (VIIB)

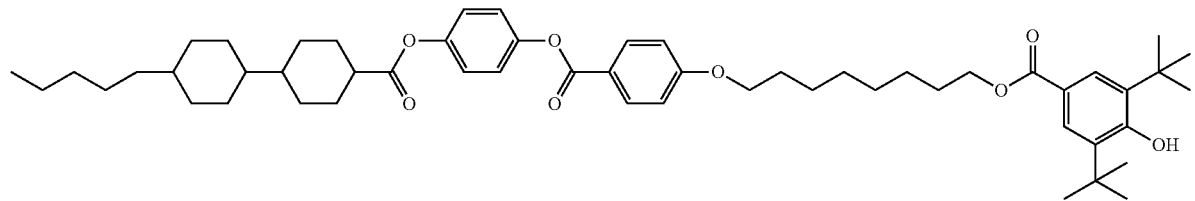

4-((4-((8-((3,5-di-tert-butyl-4-hydroxybenzoyl)oxy)octyl)oxy)benzoyl)oxy)phenyl 4'-pentyl-[1,1'-bi(cyclohexane)]-4-carboxylate, Formula (VIIC)

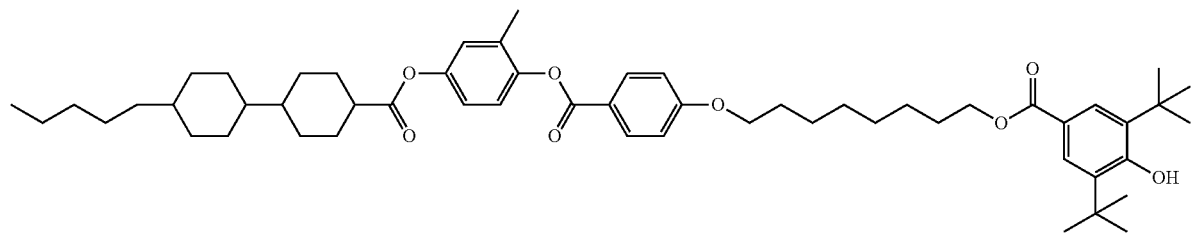

4-((4-((8-((3,5-di-tert-butyl-4-hydroxybenzoyl)oxy)octyl)oxy)benzoyl)oxy)-3-methylphenyl 4'-pentyl-[1,1'-bi(cyclohexane)]-4-carboxylate, Formula (VIID)

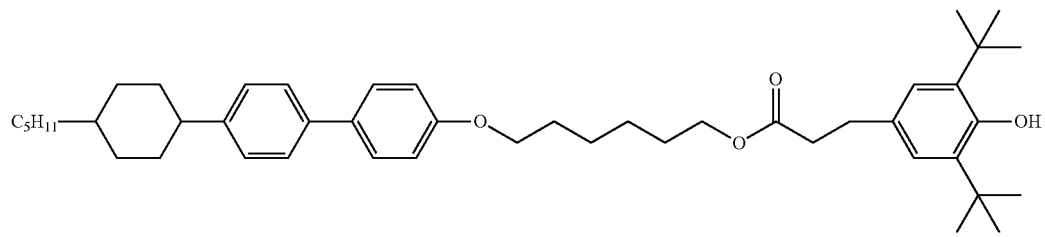

6-((4'-(4-pentylcyclohexyl)-[1,1'-biphenyl]-4-yl)oxy)hexyl 3-(3,5-di-tert-butyl-4-hydroxyphenyl)propanoate, Formula (VIIE)

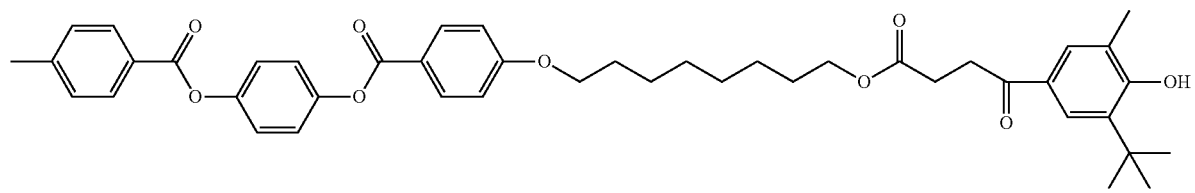

4-((4-((8-((4-(3-(tert-butyl)-4-hydroxy-5-methylphenyl)-4-oxobutanoyl)oxy)octyl)oxy)benzoyl)oxy)phenyl 4-methylbenzoate,

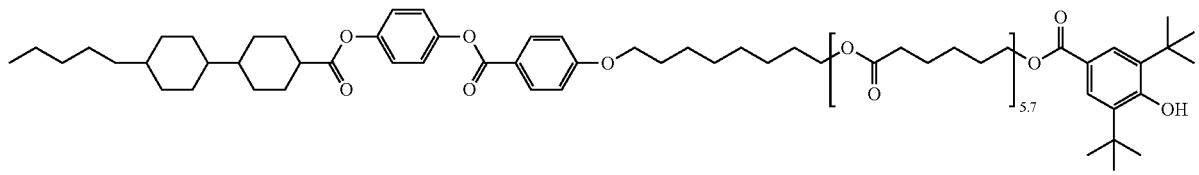

Formula (VIIF)

4-((4-((1-(3,5-di-tert-butyl-4-hydroxyphenyl)-1,8,15,22,29, 36,43-heptaoxo-2,9,16,23,30,37,44-heptaoxadopentacontan-52-yl)oxy)benzoyl)oxy)phenyl 4'-pentyl-[1,1'-bi(cyclohexane)]-4-carboxylate, and

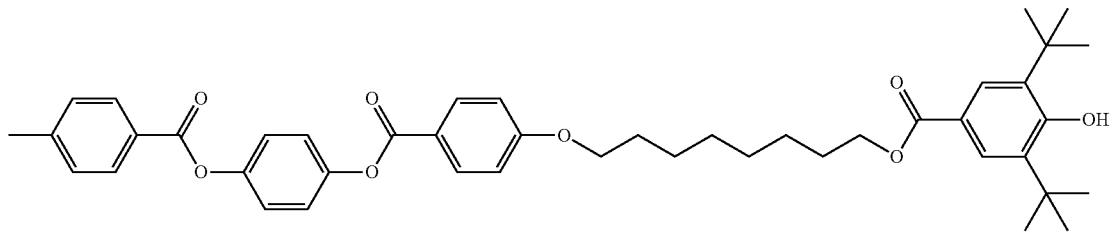

Formula (VIIG)

8-(4-((4-((4-methylbenzoyl)oxy)phenoxy)carbonyl)phenoxy)octyl 3,5-di-tert-butyl-4-hydroxybenzoate.

The amount of mesogenic antioxidant in the anisotropic layer can range from 25 mole percent to 150 mole percent, relative to the total moles of photochromic-dichroic dye(s) present in the anisotropic layer. The moles of mesogenic antioxidant is present in an amount greater than or equal to the moles of mesogenic hindered amine light stabilizer.

The anisotropic layer may further comprise an ultraviolet light absorber. Non-limiting examples of suitable ultraviolet light absorbers for the anisotropic layer include benzotriazoles, benzophenones, and combinations thereof. For example, the anisotropic layer may comprise a benzotriazole ultraviolet light absorber represented by the following Formula (VIII):

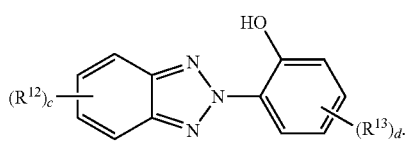

(VIII)

The benzotriazole compounds suitable for preparing the photochromic optical article of the present invention, for example, as represented by Formula (VIII), and the various groups thereof will be described in further detail herein as follows.

$R^{12}$ of the benzotriazole ultraviolet light absorber, for each c, and $R^{13}$ for each d are each independently methyl, ethyl, hydroxyl, or a halogen, such as, F or Cl. In the benzotriazole ultraviolet light absorber of Formula (VIII), c is from 0-4. In the benzotriazole ultraviolet light absorber of Formula (VIII), d is from 0-4.

Non-limiting examples of suitable benzotriazole ultraviolet light absorbers include 4-(2H-benzotriazol-2-yl)-1,3-benzenediol, 2-(2H-benzotriazol-2-yl)-1,3,5-benzenetriol, 4-(2H-benzotriazol-2-yl)-5-methyl-1,3-benzenediol, 4-(2H-benzotriazol-2-yl)-2-methyl-1,3-benzenediol, 2-(2H-benzotriazol-2-yl)-5-methoxy-phenol, 4-(2H-benzotriazol-2-yl)-1,2,3-benzenetriol, 4-(5-methyl-2H-benzotriazol-2-yl)-1,3-benzenediol, 2-(2H-benzotriazol-2-yl)-4-methyl-1,3,5-benzenetriol, 5-(2H-benzotriazol-2-yl)-1,2,4-benzenetriol, 4-(5-hydroxy-2H-benzotriazol-2-yl)-1,3-benzenediol, 4-(2H-benzotriazol-2-yl)-1,2,3,5-benzenetetrol, 2-(5-hydroxy-2H-benzotriazol-2-yl)-1,3,5-benzenetriol, 4-(2H-benzotriazol-2-yl)-2-ethyl-1,3-benzenediol, 4-(5-methoxy-2H-benzotriazol-2-yl)-1,3-benzenediol, 4-(2H-benzotriazol-2-yl)-6-chloro-1,3-benzenediol, 4-(5-fluoro-2H-benzotriazol-2-yl)-1,3-benzenediol, 2-(5-methoxy-2H-benzotriazol-2-yl)-1,3,5-benzenetriol, 2-(2,4-dihydroxyphenyl)-2H-benzotriazole-4,6-diol, 4-[5-(trifluoromethyl)-2H-benzotriazol-2-yl]-1,3-benzenediol, and combinations thereof.

Non-limiting examples of suitable benzophenones ultraviolet light absorbers include 2,2'-Dihydroxy-4-methoxybenzophenone, 2,2',4,4'-Tetrahydroxybenzophenone, 2,2'-Dihydroxy-4,4'-dimethoxybenzophenone, 2,3,4,4'-Tetrahydroxybenzophenone, 2,4-dihydroxybenzophenone, 2,4,4'-trihydroxybenzophenone, and combinations thereof.

The photochromic-dichroic dye, mesogenic antioxidant, and mesogenic hindered amine light stabilizer of the anisotropic layer, can be at least partially aligned by interaction with the polymerizable anisotropic material, which itself is at least partially ordered. For example, although not limiting herein, at least a portion of the photochromic-dichroic dye thereof can be aligned such that the long-axis of the photochromic-dichroic dye, in the dichroic state is essentially parallel to the general direction of the polymerizable anisotropic material. Further, although not required, the photochromic-dichroic dye, mesogenic antioxidant, or mesogenic hindered amine light stabilizer can be bound to or reacted with at least a portion of the at least partially ordered polymerizable anisotropic material.

The anisotropic coating layer can be applied over the substrate, or other optional layers, by art-recognized methods including, but not limited to, spin coating, spray coating, spray, and spin coating, curtain coating, flow coating, dip coating, injection molding, casting, roll coating, wire coating, and overmolding.

Methods of at least partially aligning the at least a portion of the polymerizable anisotropic materials in the anisotropic layer are described herein and in U.S. Pat. No. 7,097,303 at column 27, line 17 to column 28, line 45, which is incorporated by reference.

Methods of ordering, or introducing order into, the polymerizable anisotropic material of the anisotropic layer include, but are not limited to, exposing the polymerizable anisotropic material to at least one of a magnetic field, an electric field, linearly polarized ultraviolet radiation, linearly polarized infrared radiation, linearly polarized visible radiation, and a shear force. Alternatively or additionally, the polymerizable anisotropic material can be at least partially ordered by aligning at least a portion of the polymerizable anisotropic material with another material or structure. For example, the polymerizable anisotropic material can be at least partially ordered by aligning the polymerizable anisotropic material with an alignment layer (or an orientation facility) such as but not limited to, those alignment layers as described in further detail herein below.

By ordering at least a portion of the polymerizable anisotropic material, it is possible to at least partially align at least a portion of the photochromic-dichroic dye, mesogenic antioxidant, and mesogenic hindered amine light stabilizer that is contained within or otherwise connected to the polymerizable anisotropic material of the anisotropic layer. Although not required, the photochromic-dichroic dye can be at least partially aligned while in an activated state. Ordering of the polymerizable anisotropic material and/or aligning the photochromic-dichroic dye, mesogenic antioxidant, and mesogenic hindered amine light stabilizer can occur prior to, during, or after application of anisotropic layer over an optional primer layer or optional alignment layer.

The photochromic-dichroic dye, mesogenic antioxidant, mesogenic hindered amine light stabilizer, and the polymerizable anisotropic material can be aligned and ordered during application of the anisotropic layer. For example, the anisotropic layer can be applied using a coating technique that introduces a shear force to the polymerizable anisotropic material during application, such that the polymerizable anisotropic material becomes at least partially ordered generally parallel to the direction of the applied shear force. For purposes of non-limiting illustration, a solution or mixture (optionally in a solvent or carrier) including the photochromic-dichroic dye, mesogenic antioxidant, mesogenic hindered amine light stabilizer, and the polymerizable anisotropic material can be curtain coated over the substrate, such that shear forces are introduced to the materials being applied due to relative movement of the surface of the substrate with respect to the materials being applied. An example of a coating process that can introduce at least sufficient shear forces is a curtain coating process. The shear forces can cause at least a portion of the anisotropic material to be ordered in a general direction that is substantially parallel to the direction of the movement of the surface. As discussed above, by ordering at least a portion of the polymerizable anisotropic material in this manner, at least a portion of the photochromic-dichroic dye, mesogenic antioxidant, and mesogenic hindered amine light stabilizer can be aligned. In addition, and, optionally, by exposing at least a portion of the photochromic-dichroic dye to actinic radiation during the curtain coating process, so as to convert the photochromic-dichroic dye to an activated state, at least partial alignment of the photochromic-dichroic dye while in the activated state can also be achieved.

The photochromic-dichroic dye, mesogenic antioxidant, mesogenic hindered amine light stabilizer, and the polymerizable anisotropic material can be aligned and ordered after application of the polymerizable composition over the substrate. For example, a solution or mixture of the photochromic-dichroic dye, mesogenic antioxidant, mesogenic hindered amine light stabilizer, and the polymerizable anisotropic material (optionally in a solvent or carrier) can be spin-coated over at least a portion of the substrate. Thereafter, at least a portion of the polymerizable anisotropic material can be ordered, for example, by exposing the polymerizable anisotropic material to a magnetic field, an electric field, linearly polarized ultraviolet radiation, linearly polarized infrared radiation, linearly polarized visible radiation, and/or a shear force. Alternatively or additionally, the polymerizable anisotropic material can be at least partially ordered by alignment thereof with another material or structure, such as, an alignment layer.

The photochromic-dichroic dye, the mesogenic antioxidant, the mesogenic hindered amine light stabilizer, and the polymerizable anisotropic material can be aligned and ordered prior to application of the polymerizable composition over the substrate. For example, a solution or mixture (optionally in a solvent or carrier) of the photochromic-dichroic dye, the mesogenic antioxidant, the mesogenic hindered amine light stabilizer, and the polymerizable anisotropic material can be applied over an ordered polymeric sheet to form a layer thereover. Thereafter, at least a portion of the polymerizable anisotropic material can be allowed to align with the underlying ordered polymeric sheet. The polymeric sheet can be subsequently applied over the substrate by, for example, art-recognized laminating or bonding methods. Alternatively, the ordered anisotropic layer can be transferred from the polymeric sheet to/over the substrate by art-recognized method, such as, hot stamping.

The polymerizable anisotropic materials of the photochromic optical article can be at least partially cured or at least partially polymerized by any method known in the art, such as, those disclosed in U.S. Pat. No. 7,910,019 at column 38, lines 24 through 38, the disclosure of which is incorporated herein by reference. For example, the anisotropic polymer can comprise polymerized liquid crystal monomers. Non-limiting examples of suitable curing methods include exposing the at least partial coating to ultraviolet radiation, visible radiation, gamma radiation, microwave radiation, electron radiation, thermal energy, or combinations of any of these curing methods.

The polymerizable anisotropic materials may also be cured by exposure to a light emitting diode having a peak emission wavelength ranging from 385 to 460 nanometers, such as, from 390 to 460 nanometers, or from 410 to 460 nanometers, to effect cure (i.e., polymerization) of the anisotropic layer, where the light emitting diode can include an inorganic or organic light emitting diode. The light emitting diode light source can be an organic light emitting diode; and/or an inorganic light emitting diode, for example, those made using alloys of some or all of aluminum nitride, gallium nitride, and indium nitride. Commercially available light sources incorporating suitable inorganic light emitting diodes include LB80-438P1-84 or JL3-395-G2-12 units from Clearstone Technologies, Inc. Commercially available light sources incorporating suitable inorganic light emitting diodes are also available from Heraeus Noblelight America LLC or Phoseon Technology.

As disclosed herein, the photochromic optical article comprises one or more additional layers positioned in between the substrate and the at least partial anisotropic layer. As disclosed herein, the photochromic articles comprise one or more additional layers positioned over at least a portion of the anisotropic layer. As disclosed herein, the one or more additional layers can further comprise fixed tint dyes, dichroic dyes, photochromic-dichroic dyes, photochromic dyes, or combinations thereof.

As used herein, the term "fixed-tint dye" and related terms, such as, "fixed-colorant," "static colorant," "fixed dye," and "static dye" means dyes that are non-photosensitive materials, which do not physically or chemically respond to electromagnetic radiation with regard to the visually observed color thereof. The term "fixed-tint dye" and related terms as used herein does not include and is distinguishable from a photochromic compound. As used herein, the term "non-photosensitive materials" means materials that do not physically or chemically respond to electromagnetic radiation with regard to the visually observed color thereof, including, but not limited to, fixed-tint dyes. One or more fixed-tint dyes can be present in the one or more additional layers of the present invention for purposes including, but not limited to, providing an article prepared from the compositions with: at least a base (or first) color characteristic of the fixed-tint dye, when the photochromic compound (if used) is not activated; and, optionally, a second color characteristic of the combination of the fixed-tint dye and the photochromic compound when activated, such as, by exposed to actinic radiation. The optional fixed-tint dye of the curable photochromic composition can comprise at least one of azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, and polyene dyes.

Non-limiting examples of suitable conventional dichroic dyes include azomethines, indigoids, thioindigoids, merocyanines, indans, quinophthalonic dyes, perylenes, phthaloperines, triphenodioxazines, indoloquinoxalines, imidazotriazines, tetrazines, azo and (poly)azo dyes, benzoquinones, naphthoquinones, anthraquinone and (poly)anthroquinones, anthropyrimidinones, iodine, and iodates.

The dichroic dye can be a polymerizable dichroic compound. That is, the dichroic dye can comprise at least one group that is capable of being polymerized (i.e., a "polymerizable group"). For example, although not limiting herein the at least one dichroic compound can have at least one alkoxy, polyalkoxy, alkyl, or polyalkyl substituent terminated with at least one polymerizable group.

As discussed in further detail herein, the photochromic optical article of the present invention can include an alignment layer (also referred to as an alignment or orientation facility) that is interposed between the substrate, or an optional primer layer, and the anisotropic layer.

As used herein the term "alignment layer" means a layer that can facilitate the positioning of one or more other structures that are exposed, directly and/or indirectly, to at least a portion thereof. As used herein the term "order" means bring into a suitable arrangement or position, such as, aligning with another structure or material, or by some other force or effect. Thus, as used herein the term "order" encompasses both contact methods of ordering a material, such as, by aligning with another structure or material, and non-contact methods of ordering a material, such as, by exposure to an external force or effect. The term order also encompasses combinations of contact and non-contact methods.

For example, the photochromic-dichroic dye that is at least partially aligned by interaction with the optional alignment layer can be at least partially aligned such that the long-axis of the photochromic-dichroic dye in the activated state is essentially parallel to at least the first general direction of the alignment layer. The photochromic-dichroic dye that is at least partially aligned by interaction with the alignment layer is bound to or reacted with the alignment layer. As used herein with reference to order or alignment of a material or structure, the term "general direction" refers to the predominant arrangement or orientation of the material, compound, or structure. Further, it will be appreciated by those skilled in the art that a material, compound or structure can have a general direction even though there is some variation within the arrangement of the material, compound, or structure, provided that the material, compound, or structure has at least one predominate arrangement.

The alignment layer can have at least a first general direction. For example, the alignment layer can include a first ordered region having a first general direction and at least one second ordered region adjacent the first ordered region having a second general direction that is different from the first general direction. Further, the alignment layer can have a plurality of regions, each of which has a general direction that is the same or different from the remaining regions so as to form a desired pattern or design. The alignment layer can include, for example, a coating including an at least partially ordered alignment medium, an at least partially ordered polymer sheet, an at least partially treated surface, Langmuir-Blodgett films, and combinations thereof.

The alignment layer can include a coating that includes an at least partially ordered alignment medium. Examples of suitable alignment media that can be used in conjunction with the alignment layer include, but are not limited to, liquid crystal materials, photo-orientation materials, and rubbed-orientation materials.

The alignment medium of the alignment layer can be a liquid crystal material, and the alignment layer can be referred to as a liquid crystal alignment layer. Liquid crystal materials, because of their structure, are generally capable of being ordered or aligned so as to take on a general direction. More specifically, because liquid crystal molecules have rod- or disc-like structures, a rigid long axis, and strong dipoles, liquid crystal molecules can be ordered or aligned by interaction with an external force or another structure such that the long axis of the molecules takes on an orientation that is generally parallel to a common axis. For example, it is possible to align the molecules of a liquid crystal material with a magnetic field, an electric field, linearly polarized infrared radiation, linearly polarized ultraviolet radiation, linearly polarized visible radiation, or shear forces. It is also possible to align liquid crystal molecules with an oriented surface. For example, liquid crystal molecules can be applied to a surface that has been oriented, for example, by rubbing, grooving, or photo-alignment methods, and subsequently aligned such that the long axis of each of the liquid crystal molecules takes on an orientation that is generally parallel to the general direction of orientation of the surface. Examples of liquid crystal materials suitable for use as alignment media include, but are not limited to, liquid crystal polymers, liquid crystal pre-polymers, liquid crystal monomers, and liquid crystal mesogens. As used herein the term "pre-polymer" means partially polymerized materials.

Classes of liquid crystal monomers that are suitable for use in conjunction with the alignment layer include, but are not limited to, mono- as well as multi-functional liquid crystal monomers. The liquid crystal monomers can be cross-linkable liquid crystal monomers, such as, photocross-linkable liquid crystal monomers. As used herein the term "photocross-linkable" means a material, such as a monomer, a pre-polymer or a polymer that can be cross-linked or polymerized on exposure to actinic radiation. For example, photocross-linkable liquid crystal monomers include, but are not limited to, those liquid crystal monomers that are cross-linkable on exposure to ultraviolet radiation and/or visible radiation, either with or without the use of polymerization initiators.

Examples of cross-linkable liquid crystal monomers, that can be included in the alignment layer, include, but are not limited to, liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Examples of photocross-linkable liquid crystal monomers, that can be included in the alignment layer, include, but are not limited to, liquid crystal monomers having functional groups chosen from acrylates, methacrylates, alkynes, epoxides, thiols, and blends thereof.

Liquid crystal polymers and pre-polymers, that can be included in the alignment layer, include, but are not limited to, main-chain liquid crystal polymers and pre-polymers and side-chain liquid crystal polymers and pre-polymers. With main-chain liquid crystal polymers and pre-polymers, rod- or disc-like liquid crystal mesogens are primarily located within the polymer backbone. With side-chain liquid crystal polymers and pre-polymers, the rod- or disc-like liquid crystal mesogens primarily are located within the side chains of the polymer. Additionally, the liquid crystal polymer or pre-polymer can be cross-linkable, and further can be photocross-linkable.

Examples of liquid crystal polymers and pre-polymers, that can be included in the alignment layer, include, but are not limited to, main-chain and side-chain polymers and pre-polymers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Examples of photocross-linkable liquid crystal polymers and pre-polymers, that can be included in the alignment layer, include, but are not limited to, those polymers and pre-polymers having functional groups chosen from acrylates, methacrylates, alkynes, epoxides, thiols, and blends thereof.

Liquid crystal mesogens, that can be included in the alignment layer, include, but are not limited to, thermotropic liquid crystal mesogens and lyotropic liquid crystal mesogens. Additional classes of liquid crystal mesogens, that can be included in the alignment layer, include, but are not limited to, calamitic (or rod-like) liquid crystal mesogens and discotic (or disc-like) liquid crystal mesogens.

Examples of photo-orientation materials that can be included in the alignment layer, include, but are not limited to, those disclosed in U.S. Pat. No. 7,097,303 B2 at column 15 lines 15 to 32, the disclosure of which is incorporated by reference.

As used herein the term "rubbed-orientation material" means a material that can be at least partially ordered by rubbing at least a portion of a surface of the material with another suitably textured material. Examples of suitable materials and methods for at least partially ordering the rubbed-orientation materials include, but are not limited to, those disclosed in U.S. Pat. No. 7,097,303 B2 at column 15 lines 33 to 49, the disclosure of which is incorporated herein by reference.

The alignment layer can include an at least partially ordered polymer sheet. Examples of suitable at least partially ordered polymeric sheets and methods of at least partially ordering the polymeric sheets include, but are not limited to, those disclosed in U.S. Pat. No. 7,256,921 B2 at column 70, lines 1 to 23, the disclosure of which is incorporated herein by reference.

The alignment layer of the photochromic articles of the present invention can include an at least partially treated surface. As used herein, the term "treated surface" refers to at least a portion of a surface that has been physically altered to create at least one ordered region on least a portion of the surface. Examples of suitable treated surfaces include, but are not limited to, those disclosed in U.S. Pat. No. 7,256,921 B2 at column 70, lines 24 to 51, the disclosure of which is incorporated herein by reference.

As used herein the term "Langmuir-Blodgett films" means one or more at least partially ordered molecular films on a surface. Methods of forming Langmuir-Blodgett films include, but are not limited to, those disclosed in U.S. Pat. No. 7,256,921 B2 at column 70 lines 52 to 63, the disclosure of which is incorporated herein by reference.

The photochromic optical article of the present invention can further include an alignment transfer material interposed between the alignment layer and the anisotropic layer. The alignment transfer material can be aligned by interaction with the alignment layer, and, correspondingly, the polymerizable anisotropic material, photochromic-dichroic dye, mesogenic hindered amine light stabilizer, and mesogenic antioxidant can be aligned by interaction with the alignment transfer material. The alignment transfer material can facilitate the propagation or transfer of a suitable arrangement or position from the alignment layer to the polymerizable anisotropic material, photochromic-dichroic dye, mesogenic hindered amine light stabilizer, and mesogenic antioxidant of the anisotropic layer.

Examples of alignment transfer materials and methods of aligning alignment transfer materials include, but are not limited to, those disclosed in U.S. Pat. No. 7,097,303 B2 at column 17 lines 23 to 27 to column 18 lines 1 to 10, the disclosure of which is incorporated by reference.

The photochromic articles of the present invention can include a primer layer interposed between the substrate and the anisotropic layer. Examples of a suitable primer layer include, but are not limited to, those disclosed in U.S. Pat. No. 8,545,015 B2 at column 43 line 38 to column 47 line 67, the disclosure of which is incorporated herein by reference.

The primer layer can include a single layer or multiple layers each including tint dyes, photochromic dyes, or combinations thereof, that can be the same or different.

For example, the photochromic dye of the primer layer can be certain indeno-fused napthopyran compounds, such as, described in U.S. Pat. No. 6,296,785, at column 3, lines 66 through column 10, line 51, which disclosure is incorporated herein by reference.

The photochromic optical article of the present invention can include a topcoat layer that resides over the anisotropic layer. Examples of a suitable topcoat layer include, but are not limited to, those described in U.S. Pat. No. 8,545,015 B2 at column 48 line 1 to column 51 line 42, the disclosure of which is incorporated herein by reference.

The topcoat layer can include a single layer or multiple layers each including tint dyes, photochromic dyes, or combinations thereof, that can be the same or different.

Compositions from which the topcoat layer is formed can include one or more additives, including, but not limited to, adhesion promoters, coupling agents, ultraviolet light absorbers, thermal stabilizers, catalysts, free radical scavengers, plasticizers, flow additives, and/or static tints or static dyes (i.e., tints or dyes that are not photochromic).

The topcoat layer can include an ultraviolet light absorber, and is free of tint dyes, dichroic dyes, photochromic-dichroic dyes, photochromic dyes, or combinations thereof. The topcoat layer can include an ultraviolet light absorber and tint dyes, photochromic dyes, or combinations thereof. The topcoat layer can include tint dyes, photochromic dyes, or combinations thereof, and is free of an ultraviolet light absorber. The ultraviolet light absorber can be one or more art-recognized classes of ultraviolet light absorbers, including, but not limited to: benzophenones; and/or benzotriazoles. The ultraviolet light absorbers can be any ultraviolet light absorber as described herein above. The ultraviolet light absorber is typically present in at least an effective amount, such as, from 0.1 to 10 percent by weight, or 0.2 to 5 percent by weight, or from 0.3 to 3 percent by weight, based on the total solids weight of the coating composition from which the topcoat layer is prepared.

The topcoat layer can include a photochromic dye, such as, any of those described herein above.

The photochromic articles of the present invention can further comprise a hard coat layer that resides over the topcoat layer. Examples of a suitable hard coat layer include, but are not limited to, those described in U.S. Pat. No. 8,545,015 B2 at column 55 line 49 to column 56 line 31, the disclosure of which is incorporated herein by reference. The hard coat layer can include a single layer or multiple layers.

The photochromic articles of the present invention can include additional coatings, such as, antireflective coatings. For example, an antireflective coating can be applied over the hard coat layer. Examples of antireflective coatings are described in U.S. Pat. No. 6,175,450 and International Patent Application Publication No. WO 00/33111, the disclosures of which are incorporated herein by reference.

Examples of solvents that can be present in forming the various layers of the photochromic optical articles of the present invention, such as, the anisotropic layer, can include solvents such as, water, organic solvents common in the art, and combinations thereof.

Substrates from which the substrate of the photochromic articles of the present invention can be selected include, but are not limited to, substrates formed from organic materials, inorganic materials, or combinations thereof (for example, composite materials).

Non-limiting examples of organic materials that can be used to form the substrate of the photochromic articles of the present invention include polymeric materials, such as, those described in U.S. Pat. No. 7,097,303 B2 at column 5, lines 12 to 56. Suitable polymeric materials that can be used to form the substrate of the photochromic articles of the present invention are polycarbonate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, poly(vinyl acetate), poly(vinyl alcohol), poly(vinyl chloride), poly(vinylidene chloride), poly(ethylene terephthalate), polyester, polysulfone, polyolefin, copolymers thereof, or mixtures thereof.

The substrate can be an ophthalmic substrate. Non-limiting examples of organic materials suitable for use in forming ophthalmic substrates include, but are not limited to, the art-recognized polymers that are useful as ophthalmic substrates, such as, organic optical resins that are used to prepare optically clear castings for optical applications, such as, ophthalmic lenses.

Other non-limiting examples of organic materials suitable for use in forming the substrate of the photochromic articles of the present invention include both synthetic and natural organic materials, including without limitation: opaque or translucent polymeric materials, natural and synthetic textiles, and cellulosic materials such as, paper and wood.

Non-limiting examples of inorganic materials suitable for use in forming the substrate of the photochromic articles of the present invention include glasses, minerals, ceramics, and metals. For example, the substrate can include glass. For example, the substrate can have a reflective surface, for example, a polished ceramic substrate, metal substrate, or mineral substrate. A reflective coating or layer can be deposited or otherwise applied to a surface of an inorganic or an organic substrate to make it reflective or to enhance its reflectivity.

Further, the substrate can have a protective coating, such as but not limited to, an abrasion-resistant coating, such as, a "hard coat," on its exterior surfaces. For example, commercially available thermoplastic polycarbonate ophthalmic lens substrates are often sold with an abrasion-resistant coating already applied to its exterior surfaces because these surfaces tend to be readily scratched, abraded, or scuffed. An example of such a lens substrate is the GENTEX™ polycarbonate lens (available from Gentex Optics). Therefore, as used herein the term "substrate" includes a substrate having a protective coating, such as but not limited to, an abrasion-resistant coating, on its surface(s).

Still further, the substrate of the photochromic article of the present invention can be untinted, tinted, linearly polarizing, circularly polarizing, elliptically polarizing, photochromic, or tinted-photochromic substrates. As used herein with reference to substrates the term "untinted" means substrates that are essentially free of coloring agent additions (such as but not limited to, conventional dyes) and have an absorption spectrum for visible radiation that does not vary significantly in response to actinic radiation. Further, with reference to substrates the term "tinted" means substrates that have a coloring agent addition (such as but not limited to, conventional dyes) and an absorption spectrum for visible radiation that does not vary significantly in response to actinic radiation.

As used herein the term "linearly polarizing" with regard to the substrate means substrates that are adapted to linearly polarize radiation. As used herein the term "circularly polarizing" with regard to the substrate means substrates that are adapted to circularly polarize radiation. As used herein the term "elliptically polarizing" with regard to the substrate means substrates that are adapted to elliptically polarize radiation. Further, as used herein with regard to the substrate, the term "tinted-photochromic" means substrates containing a coloring agent addition as well as a photochromic material, and having an absorption spectrum for visible radiation that varies in response to at least actinic radiation. Thus, for example and without limitation, a tinted-photochromic substrate can have a first color characteristic of the coloring agent and a second color characteristic of the combination of the coloring agent the photochromic material when exposed to actinic radiation.

The one or more layers suitable for preparing the photochromic articles of the present invention can be applied over a substrate by art-recognized methods including, but not limited to, spin coating, spray coating, spray and spin coating, curtain coating, flow coating, dip coating, injection molding, casting, roll coating, wire coating, and overmolding.

The one or more layers of the photochromic optical article can be at least partially cured or at least partially polymerized by any of the methods described herein above with respect to the anisotropic layer.

A photochromic coated article can be prepared according to the present invention. The photochromic coated article includes a substrate. The photochromic coated article further includes an anisotropic coating layer disposed on the at least a portion of the surface of the substrate. The anisotropic coating layer of the photochromic coated article is formed from a polymerizable composition. The polymerizable composition includes a polymerizable anisotropic material, a photochromic-dichroic dye, a photochromic dye, or combinations thereof, a mesogenic hindered amine light stabilizer, and a mesogenic antioxidant.

The substrate of the photochromic coated article can be any substrate as described with respect to the photochromic optical article.

The polymerizable anisotropic material, mesogenic hindered amine light stabilizer, and mesogenic antioxidant of the photochromic coated article can be any of the polymerizable anisotropic materials, mesogenic hindered amine light stabilizers, and mesogenic antioxidants described above with respect to the photochromic optical article.

The photochromic-dichroic dye and/or the photochromic dye of the polymerizable composition can be any of the photochromic-dichroic dyes or photochromic dyes described with respect to the photochromic optical article.

The polymerizable composition of the photochromic coated article can further comprise an ultraviolet light absorber selected from the group consisting of benzotriazoles, benzophenones, and combinations thereof.

The polymerizable anisotropic material, mesogenic antioxidant, mesogenic hindered amine light stabilizer, and the photochromic-dichroic dye, photochromic dye, or combinations thereof of the polymerizable composition of the anisotropic coating layer is at least partially aligned. The mesogenic antioxidant, mesogenic hindered amine light stabilizer, and the photochromic-dichroic dye, photochromic dye, or combinations thereof of the polymerizable composition of the anisotropic coating layer can be aligned using any suitable method as described herein above.

As disclosed herein above, the photochromic coated article comprises one or more additional layers positioned in between the substrate and the anisotropic coating layer. As disclosed herein above, the photochromic coated articles comprise one or more additional layers positioned over at least a portion of the at least partial anisotropic coating layer. As disclosed herein above, the one or more additional layers can further comprise fixed tint dyes, dichroic dyes, photochromic-dichroic dyes, photochromic dyes, or combinations thereof.

The present invention relates, for example, without being limited thereto, to the following aspects.

In a first aspect, the present invention may relate to a photochromic optical article comprising: an optical substrate; and an at least partial anisotropic layer disposed on the at least a portion of the surface of the substrate, wherein the anisotropic layer comprises: an anisotropic polymer; a photochromic-dichroic dye, a photochromic dye, or combinations thereof; a mesogenic hindered amine light stabilizer; and a mesogenic antioxidant.

In a second aspect of the present invention, in the photochromic optical article as described above for the first aspect, the anisotropic layer further comprises an ultraviolet light absorber selected from the group consisting of benzotriazoles, benzophenones, and combinations thereof.

In a third aspect of the present invention, in the photochromic optical article as described above for the second aspect, the ultraviolet light absorber is a benzotriazole represented by the following Formula (VIII):

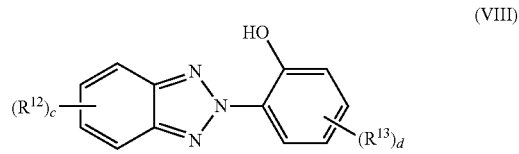

wherein $R^{12}$ for each c, and $R^{13}$ for each d are each independently methyl, ethyl, hydroxyl, or a halogen; c is 0-4; and d is 0-4.

In a fourth aspect of the present invention, in the photochromic optical article as described above for any one of the first to third aspects, the anisotropic polymer comprises polymerized liquid crystal monomers.

In a fifth aspect of the present invention, in the photochromic optical article of any one of the first to fourth aspects, the mesogenic hindered amine light stabilizer is a compound represented by the following Formula (I):

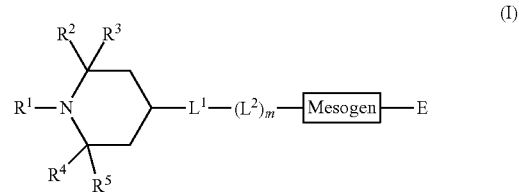

wherein $R^1$ is hydrogen, alkyl, alkoxy, acetyl, hydroxyl or oxide, $R^2$, $R^3$, $R^4$, and $R^5$ are each independently hydrogen or alkyl, provided that two or more of $R^2$, $R^3$, $R^4$, and $R^5$ are alkyl, $L^1$ is a divalent linking group which is a divalent bond, or one of the following Formulas (IIa), (IIb), (IIc), (IId), (IIe), or (IIf),

wherein $R^6$ is a divalent alkyl or a divalent substituted alkyl,

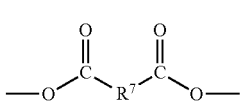

wherein $R^7$ is a divalent alkyl or a divalent substituted alkyl,

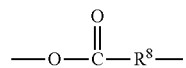

wherein $R^8$ is a is a divalent alkyl or a divalent substituted alkyl group, or

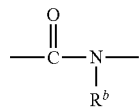

wherein $R^b$ is hydrogen, alkyl or substituted alkyl, m is from 0 to 4, $L^2$ is, independently for each m, a divalent $C_1$-$C_{25}$ alkyl or a divalent $C_2$-$C_{25}$ alkenyl, in each case optionally interrupted with at least one of —O—, —C(O)—, —C(O)O—, or —OC(O)O—, the mesogen is represented by the following Formula (III),

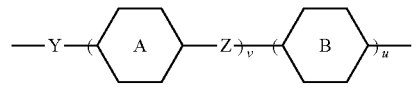

wherein Y is a divalent linking group which is a divalent bond, —O—, or —S—, v and u are each independently 0 to 4, provided that the sum of v and u is 2 to 4, Z is, independently for each v, a divalent linking group which a divalent bond, —O—, —S—, —C(O)—, —C(O)O—, —OC(O)O—, —N($R^9$)—C(O)—O—, or —C(O)—N ($R^9$)—, wherein $R^9$ is hydrogen, alkyl or substituted alkyl, the divalent rings,

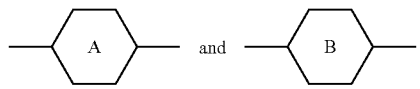

are each independently, for each v and each u, phenylen-1,4-diyl, or substituted phenylen-1,4-diyl, or cyclohexan-1,4-diyl, or substituted cyclohexan-1,4-diyl, and E is hydrogen, linear or branched $C_1$-$C_{25}$ alkyl, linear or branched $C_2$-$C_{25}$ alkenyl, linear or branched $C_2$-$C_{25}$ alkynyl, each optionally interrupted with at least one of —O—, —S—, —C(O)—, —C(O)O—, or —OC(O)O—, provided that a direct $L^1$-$L^2$ link between $L^1$ and $L^2$ is free of two heteroatoms linked together, a direct $L^1$-Mesogen link between $L^1$ and Y is free of two heteroatoms linked together, and each direct $L^2$-Mesogen link between each directly linked $L^2$ and Y is free of two heteroatoms linked together.

In a sixth aspect of the present invention, in the photochromic optical article as described above for the fifth aspect, the mesogenic hindered amine light stabilizer is $R^1$ is hydrogen, alkyl, or alkoxy; $R^2$, $R^3$, $R^4$, and $R^5$ are each alkyl; the sum of v and u is 3 to 4; Z is, independently for each v, a divalent linking group which is a divalent bond and —C(O)O—; and E is alkyl.

In a seventh aspect of the present invention, in the photochromic optical article of the fifth or sixth aspect, the mesogenic antioxidant is a compound represented by the following Formula (V):

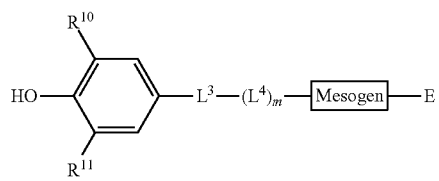

wherein $R^{10}$ and $R^{11}$ are each independently hydrogen or alkyl, provided that at least one of $R^{10}$ and $R^{11}$ is alkyl, $L^3$ is a divalent linking group which is a divalent bond, or one of the following Formulas (VIa), (VIb), (VIc), (VId), (VIe), or (VIf)

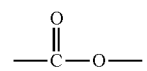

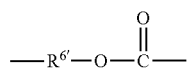

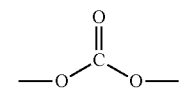

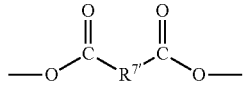

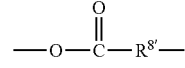

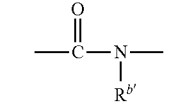

wherein $R^{6'}$, $R^{7'}$, $R^{8'}$, and $R^{b'}$ are each independently $R^6$, $R^7$, $R^8$, and $R^b$, respectively, m is from 0 to 4, $L^4$ is, independently for each m, a divalent $C_1$-$C_{25}$ alkyl or a divalent $C_2$-$C_{25}$ alkenyl, in each case optionally interrupted with at least one of —O—, —C(O)—, —C(O)O—, or —OC(O) O—, the Mesogen is represented by Formula (III), and E is hydrogen, linear or branched $C_1$-$C_{25}$ alkyl, linear or branched $C_2$-$C_{25}$ alkenyl, linear or branched $C_2$-$C_{25}$ alkynyl, each optionally interrupted with at least one of —O—, —S—, —C(O)—, —C(O)O—, or —OC(O)O—; provided that a direct $L^3$-$L^4$ link between $L^3$ and $L^4$ is free of two heteroatoms linked together, a direct $L^3$-Mesogen link between $L^3$ and Y is free of two heteroatoms linked together, and each direct $L^4$-mesogen link between each directly linked $L^4$ and Y is free of two heteroatoms linked together.

In an eighth aspect of the present invention, in the photochromic optical article as described above in the seventh aspect, the mesogenic antioxidant is $R^{10}$ and $R^{11}$ are each independently alkyl, provided that at least one of $R^{10}$ and $R^{11}$ is branched alkyl; the sum of v and u is 3 to 4; Z is, independently for each v, a divalent linking group which is a divalent bond or —C(O)O—; and E is alkyl.

In a ninth aspect of the present invention, in the photochromic optical article according to any one of the preceding first to eighth aspects, the mesogenic antioxidant; the mesogenic hindered amine light stabilizer; and the photochromic-dichroic dye, the photochromic dye, or a combination thereof of the at least partial anisotropic layer is at least partially aligned.

In a tenth aspect of the present invention, in the photochromic optical article as described above in any one of the first to ninth aspects, the photochromic optical article further comprises one or more layers positioned between the substrate and the at least partial anisotropic layer.

In an eleventh aspect of the present invention, in the photochromic optical article as described above in any one of the first to tenth aspects, the photochromic optical article further comprises one or more layers positioned over at least a portion of the at least partial anisotropic layer.

In a twelfth aspect of the present invention, in the photochromic optical article according to any one of the preceding tenth or eleventh aspects, the one or more layers can further comprise fixed tint dyes, dichroic dyes, photochromic-dichroic dyes, photochromic dyes, or combinations thereof.

In a thirteenth aspect of the present invention, in the photochromic optical article as described above in any one of the first to twelfth aspects, the substrate comprises a polymeric material selected from the group consisting of polycarbonate, polycyclic alkene, polyurethane, poly(urea)urethane, polythiourethane, polythio(urea)urethane, polyol (allyl carbonate), cellulose acetate, cellulose diacetate, cellulose triacetate, cellulose acetate propionate, cellulose acetate butyrate, poly(vinyl acetate), poly(vinyl alcohol), poly(vinyl chloride), poly(vinylidene chloride), poly(ethylene terephthalate), polyester, polysulfone, polyolefin, copolymers thereof, and mixtures thereof.

In a fourteenth aspect of the present invention, in the photochromic optical article as described above in any one of the first to thirteenth aspects, the article is an optical element selected from the group consisting of ophthalmic articles, display articles, windows, and mirrors.

In a fifteenth aspect of the present invention, in the photochromic optical article as described above in the fourteenth aspect, the ophthalmic article is selected from the group consisting of corrective lenses, non-corrective lenses, contact lenses, and protective lenses.

In a sixteenth aspect, the present invention may relate to a photochromic coated article comprising: a substrate; and an anisotropic coating layer on at least a portion of the surface of the substrate, wherein the anisotropic coating layer is formed from a polymerizable composition comprising: a polymerizable anisotropic material; a photochromic-dichroic dye, a photochromic dye, or combinations thereof; a mesogenic hindered amine light stabilizer; and a mesogenic antioxidant.

In a seventeenth aspect of the present invention, in the photochromic coated article as described above for the sixteenth aspect, the polymerizable composition further comprises an ultraviolet light absorber selected from the group consisting of benzotriazoles, benzophenones, and combinations thereof.

In an eighteenth aspect of the present invention, in the photochromic coated article as described above for the seventeenth aspect, the ultraviolet light absorber is a benzotriazole represented by the following Formula (VIII):

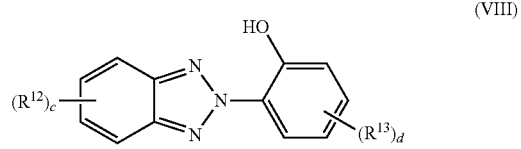

wherein $R^{12}$ for each c, and $R^{13}$ for each d are each independently methyl, ethyl, hydroxyl, or a halogen; c is 0-4; and d is 0-4.

In a nineteenth aspect of the present invention, in the photochromic coated article of any one of the sixteenth to eighteenth aspects, the mesogenic hindered amine light stabilizer is a compound represented by the following Formula (I):

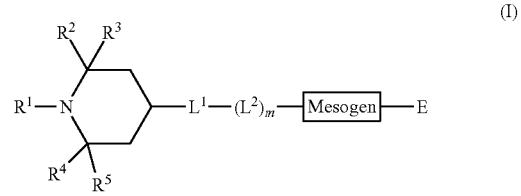

wherein $R^1$ is hydrogen, alkyl, alkoxy, acetyl, hydroxyl or oxide, $R^2$, $R^3$, $R^4$ and $R^5$ are each independently hydrogen or alkyl, provided that two or more of $R^2$, $R^3$, $R^4$ and $R^5$ are alkyl, $L^1$ is a divalent linking group which is a divalent bond, or one of the following Formulas (IIa), (IIb), (IIc), (IId), (IIe), or (IIf),

wherein $R^6$ is a divalent alkyl or a divalent substituted alkyl,

-continued

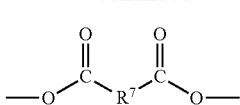
(IId)

wherein $R^7$ is a divalent alkyl or a divalent substituted alkyl,

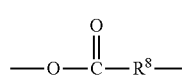
(IIe)

wherein $R^8$ is a divalent alkyl or a divalent substituted alkyl, or

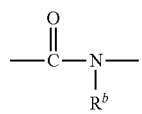
(IIf)

wherein $R^b$ is hydrogen, alkyl or substituted alkyl, m is from 0 to 4, $L^2$ is, independently for each m, a divalent $C_1$-$C_{25}$ alkyl or a divalent $C_2$-$C_{25}$ alkenyl, in each case optionally interrupted with at least one of —O—, —C(O)—, —C(O)O—, or —OC(O)O—, the mesogen is represented by the following Formula III,

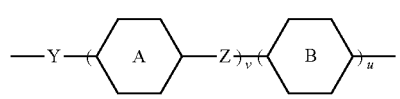
(III)

wherein Y is a divalent linking group which is a divalent bond, —O—, or —S—, v and u are each independently 0 to 4, provided that the sum of v and u is 2 to 4, Z is, independently for each v, a divalent linking group which a divalent bond, —O—, —S—, —C(O)—, —C(O)O—, —OC(O)O—, —N($R^9$)—C(O)—O—, or —C(O)—N ($R^9$)—, wherein $R^9$ is hydrogen, alkyl or substituted alkyl, the divalent rings,

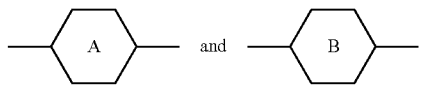

are each independently, for each v and each u, phenylen-1,4-diyl, or substituted phenylen-1,4-diyl, or cyclohexan-1,4-diyl, or substituted cyclohexan-1,4-diyl, and E is hydrogen, linear or branched $C_1$-$C_{25}$ alkyl, linear or branched $C_2$-$C_{25}$ alkenyl, linear or branched $C_2$-$C_{25}$ alkynyl, each optionally interrupted with at least one of —O—, —S—, —C(O)—, —C(O)O—, or —OC(O)O—, provided that a direct $L^1$-$L^2$ link between $L^1$ and $L^2$ is free of two heteroatoms linked together, a direct $L^1$-Mesogen link between $L^1$ and Y is free of two heteroatoms linked together, and each direct $L^2$-Mesogen link between each directly linked $L^2$ and Y is free of two heteroatoms linked together.

In a twentieth aspect of the present invention, in the photochromic coated article as described above for the nineteenth aspect, the mesogenic hindered amine light stabilizer is $R^1$ is hydrogen, alkyl, or alkoxy; $R^2$, $R^3$, $R^4$, and $R^5$ are each alkyl; the sum of v and u is 3 to 4; Z is, independently for each v, a divalent linking group which is a divalent bond or —C(O)O—; and E is alkyl.

In a twenty first aspect of the present invention, in the photochromic coated article of the nineteenth or twentieth aspect, the mesogenic antioxidant of is a compound represented by the following Formula (V):

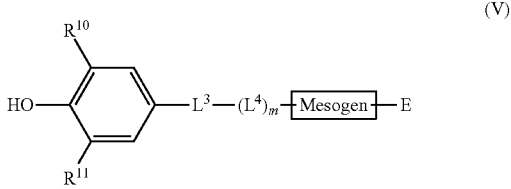
(V)

wherein $R^{10}$ and $R^{11}$ are each independently hydrogen or alkyl, provided that at least one of $R^{10}$ and $R^{11}$ is alkyl, $L^3$ is a divalent linking group which is a divalent bond, or one of the following Formulas (VIa), (VIb), (VIc), (VId), (VIe), or (VIf):

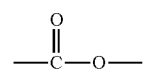
(VIa)

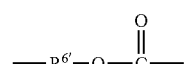
(VIb)

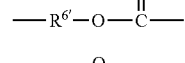
(VIc)

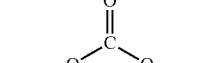
(VId)

(VIe)

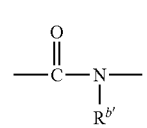
(VIf)

wherein $R^{6'}$, $R^{7'}$, $R^{8'}$, and $R^{b'}$ are each independently $R^6$, $R^7$, $R^8$, and $R^b$, respectively, m is from 0 to 4, $L^4$ is, independently for each m, a divalent $C_1$-$C_{25}$ alkyl or a divalent $C_2$-$C_{25}$ alkenyl, in each case optionally interrupted with at least one of —O—, —C(O)—, —C(O)O—, or —OC(O) O—, the Mesogen is as represented by Formula (III), and E is hydrogen, linear or branched $C_1$-$C_{25}$ alkyl, linear or branched $C_2$-$C_{25}$ alkenyl, linear or branched $C_2$-$C_{25}$ alkynyl, each optionally interrupted with at least one of —O—, —S—, —C(O)—, —C(O)O—, or —OC(O)O—; provided that a direct $L^3$-$L^4$ link between $L^3$ and $L^4$ is free of two heteroatoms linked together, a direct $L^3$-Mesogen link between $L^3$ and Y is free of two heteroatoms linked together, and each direct $L^4$-mesogen link between each directly linked $L^4$ and Y is free of two heteroatoms linked together.

In a twenty second aspect of the present invention, in the photochromic coated article as described above in the twenty first aspect, the mesogenic antioxidant is $R^{10}$ and $R^{11}$ are each independently alkyl, provided that at least one of $R^{10}$ and $R^{11}$ is branched alkyl; the sum of v and u is 3 to 4; Z is, independently for each v, a divalent linking group which is a divalent bond or —C(O)O—; and E is alkyl.

In a twenty third aspect of the present invention, in the photochromic coated article according to any one of the preceding sixteenth to twenty second aspects, the mesogenic antioxidant; the mesogenic hindered amine light stabilizer; and the photochromic-dichroic dye, the photochromic dye, or a combination thereof of the anisotropic coating layer of the are at least partially aligned.

In a twenty fourth aspect of the present invention, in the photochromic coated article as described above in any one of the sixteenth to twenty third aspects, the photochromic coated article further comprises one or more layers positioned between the substrate and the anisotropic coating layer.

In a twenty fifth aspect of the present invention, in the photochromic coated article as described above in any one of the sixteenth to twenty fourth aspects, the photochromic coated article further comprises one or more layers positioned over at least a portion of the anisotropic coating layer.

In a twenty sixth aspect of the present invention, in the photochromic coated article according to any one of the preceding twenty fourth or twenty fifth aspects, the one or more layers of further comprise fixed tint dyes, dichroic dyes, photochromic-dichroic dyes, photochromic dyes, or combinations thereof.

In a twenty seventh aspect of the present invention, in the photochromic coated article according to any one of the preceding sixteenth to twenty sixth aspects, the substrate comprises a polymeric material selected from the group consisting of polycarbonate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, poly(vinyl acetate), poly(vinyl alcohol), poly(vinyl chloride), poly(vinylidene chloride), poly(ethylene terephthalate), polyester, polysulfone, polyolefin, copolymers thereof, and mixtures thereof.

In a twenty eighth aspect of the present invention, in the photochromic coated article according to any one of the sixteenth to twenty seventh aspects, the article is selected from the group consisting of ophthalmic articles, display articles, windows, and mirrors.

In a twenty ninth aspect of the present invention, in the photochromic coated article according to the twenty eighth aspect, the coated article is an ophthalmic article selected from the group consisting of corrective lenses, non-corrective lenses, contact lenses, and protective lenses.

The present invention will be described in the following illustrative, non-limiting examples. Numerous possible modifications and variations will be apparent to those skilled in the art.

EXAMPLES

Part 1: Preparation of Photopolymerizable Coating Compositions

A photopolymerizable coating composition comprised of photopolymerizable anisotropic materials, photochromic-dichroic dyes, and a photoinitiator was prepared using the materials in Table 1 to make a liquid crystal coating formulation ("LCCF") stock solution that would then be used to make Coatings Examples A through K. The amounts listed are in parts by weight.

For the LCCF stock solution, the materials of Charge 1 were combined in an amber jar equipped with a magnetic stir bar and stirred at room temperature for a minimum of one hour until the composition appeared homogenous. Next, the materials of Charge 2 were added and the combined materials were stirred on a hot plate set to 90° C. for one hour. Charge 3 was added next and the combined materials stirred on a hot plate set to 90° C. for one hour. Charge 4 was added and the combined materials were stirred on a hot plate set to 65° C. for thirty minutes.

TABLE 1

| LCCF stock solution | |
|---|---|
| Material | Amount (parts by weight) |
| Charge 1 | |
| BYK-322[1] | 0.04 |
| 4-methoxyphenol | 0.06 |
| anisole | 39.90 |
| Charge 2 | |
| Photochromic dichroic Dye Blend[2] | 7.20 |
| Charge 3 | |
| RM-257[3] | 42.00 |
| LCM-2[4] | 22.00 |
| LCM-3[5] | 18.00 |
| LCM-4[6] | 18.00 |
| Charge 4 | |
| phenylbis(2,4,6-trimethylbenzoyl)phosphine oxide | 1.50 |

[1]An aralkyl-modified polymethylalkylsiloxane available from BYK Chemie, USA.
[2]A mixture of three photochromic-dichroic indenofused napthopyran dyes formulated to give a grey color when activated.
[3]A liquid crystal monomer 4-(3-acryloyloxypropyloxy)-benzoic acid 2-methyl-1,4-phenylene ester, available commercially from Merck KGaA, Darmstadt, Germany.
[4]4-((4-((8-((6-(((6-(((6-(((6-(((6-((6-(methacryloyloxy)hexanoyl)oxy)hexanoyl)oxy)hexanoyl)oxy)hexanoyl)oxy)hexanoyl)oxy)hexanoyl)oxy)octyl)oxy)benzoyl)oxy)phenyl 4'-pentyl-[1,1'-bi(cyclohexane)]-4-carboxylate, prepared according to procedures described in U.S. Pat. No. 7,910,019B2.
[5]A liquid crystal monomer corresponding to Example 17 in U.S. Pat. No. 7,910,019 B2.
[6]3-methyl-4-((4-pentylcyclohexane-1-carbonyl)oxy)phenyl 4-((6-(acryloyloxy)hexyl)oxy)benzoate.

The LCCF stock solution described above was divided into eleven parts and added to amber vials with magnetic stir bars. To each vial, the hindered amine light stabilizer ("HALS"), antioxidant, and ultraviolet ("UV") light absorber ("UVA") materials, indicated in the following Tables 2, 3, and 4, were added and stirred on a hot plate set to for thirty minutes. After cooling, $MgSO_4$ was added and the mixture was stirred at room temperature for a minimum of thirty minutes. The resulting solution was then passed through a polyvinylidene fluoride filter with a 5.0 micron pore size before use.

TABLE 2

| Coating Examples A through D | | | | |
|---|---|---|---|---|
| | Coating Example (parts by weight) | | | |
| Material | A | B | C | D |
| LCCF stock solution | 100.0 | 94.91 | 93.95 | 93.88 |
| Mesogenic HALS[7] | — | 0.86 | 0.85 | 0.85 |

TABLE 2-continued

Coating Examples A through D

| Material | Coating Example (parts by weight) | | | |
|---|---|---|---|---|
| | A | B | C | D |
| Mesogenic antioxidant[8] | — | 4.23 | 4.19 | 4.19 |
| CYASORB ® UV-24[9] | — | — | 1.01 | — |
| 2-(2,4-dihydroxyphenyl)-2H-benzotriazole | — | — | — | 1.08 |
| $MgSO_4$ | 2.80 | 2.95 | 2.98 | 2.98 |

[7] 1,2,2,6,6-pentamethyl-4-((4-oxo-4-((4'-(trans-4-pentylcyclohexyl)-[1,1'-biphenyl]-4-yl)oxy)butanoyl)oxy)piperidine, prepared according to procedures described in U.S. Pat. No. 8,349,210 B2.
[8] 8-(4-(((4-methylbenzoyl)oxy)phenoxy)carbonyl)phenoxy)octyl 3,5-di-tert-butyl-4-hydroxybenzoate

TABLE 3

Comparative Coating Examples E through H, each with a single mesogenic HALS or antioxidant component

| Material | Coating Example (parts by weight) | | | |
|---|---|---|---|---|
| | E | F | G | H |
| LCCF stock solution | 99.10 | 95.73 | 95.67 | 94.72 |
| Mesogenic HALS[7] | 0.90 | — | 4.33 | — |
| Mesogenic antioxidant[8] | — | 4.27 | — | 5.28 |
| $MgSO_4$ | 2.83 | 2.93 | 2.93 | 2.96 |

TABLE 4

Comparative Coating Examples I through K, with non-mesogenic HALS and antioxidant components

| Material | Coating Example (parts by weight) | | |
|---|---|---|---|
| | I | J | K |
| LCCF stock solution | 95.70 | 94.73 | 94.66 |
| Tinuvin 292[9] | 0.77 | 0.76 | 0.76 |
| Irganox 245[10] | 3.53 | 3.50 | 3.49 |
| CYASORB ® UV-24 | — | 1.02 | — |
| 2-(2,4-dihydroxyphenyl)-2H-benzotriazole | — | — | 1.09 |
| $MgSO_4$ | 2.93 | 2.96 | 2.96 |

[9] A mixture of Bis (1,2,2,6,6-pentamethyl-4-piperidyl) sebacate and Methyl 1,2,2,6,6-pentamethyl-4-piperidyl sebacate hindered amine light stabilizer, available commercially from BASF.
[10] Ethylene bis(oxyethylene) bis-(3-(5-tert-butyl-4-hydroxy-m-tolyl)propionate) antioxidant, available commercially from BASF.

Table 5 below describes the molar ratio of each HALS, antioxidant, and ultraviolet light absorber material added with respect to the total moles of photochromic-dichroic dyes in each of the Coating Examples prepared above.

TABLE 5

Molar ratio of components relative to total moles of photochromic-dichroic dye

| Material | Coating Example | | | | | | | | | | |
|---|---|---|---|---|---|---|---|---|---|---|---|
| | A | B | C | D | E | F | G | H | I | J | K |
| Mesogenic HALS | — | 0.25 | 0.25 | 0.25 | 0.25 | — | 1.25 | — | — | — | — |
| Mesogenic antioxidant | — | 1.00 | 1.00 | 1.00 | — | 1.00 | — | 1.25 | — | — | — |
| Tinuvin 292 | — | — | — | — | — | — | — | — | 0.25 | 0.25 | 0.25 |
| Irganox 245 | — | — | — | — | — | — | — | — | 1.00 | 1.00 | 1.00 |
| UV-24 | — | — | 0.75 | — | — | — | — | — | — | 0.75 | — |
| DHP-BTz | — | — | — | 0.75 | — | — | — | — | — | — | 0.75 |

Part 2: Preparation of Coated Articles

Finished plano lenses made from CR-39® monomer (6 base, 65 mm diameter) were used as substrates for all coated articles. The lenses were cleaned by wiping with a paper cloth dampened with isopropanol and then dried in air. Next, each lens was corona treated with a Power Generator HV 2000 (serial no. 020270) from Tantec EST Inc. set at 70 kV and 1000 W with a belt speed of 3 ft/min.

After the corona treatment, a photoalignment coating corresponding to Example 1 of U.S. Pat. No. 9,475,901 was applied to each lens via a spin coating process. Approximately 1.5 milliliters (mL) of the solution was applied to a portion of the lens surface. The lens was spun using a spin processor from Laurel) Technologies Corp. (WS-650-MZ-23NPPB) at 800 revolutions per minutes (rpm) for two seconds, followed by 1,000 rpm for seven seconds, followed by 2,500 rpm for four seconds. Next, each coated lens was placed in a forced air convection oven set at 80° C. for approximately thirteen minutes.

After the lenses cooled, each lens was exposed to linearly polarized ultraviolet light. The light source was positioned such that the light was polarized in a plane perpendicular to the top surface of the lens. The energy density that each photoalignment coating was exposed to was measured using a UV Power Puck™ II high energy radiometer (S/N:18938) from Uvitron International, Inc. The measured energy densities were in the following: UV-V of 1.5 $J/cm^2$, UV-A of 3.1 $J/cm^2$, UV-B of 0.4 $J/cm^2$, and UV-C of 0.01 $J/cm^2$.

Next, the Coating Examples were applied to each lens via a spin coating process. The coating used for each example and counter example is given in Table 6. Approximately 1.5 mL of coating was applied to a portion of the lens surface. The lens was spun using a spin processor from Laurell Technologies Corp. (WS-650-MZ-23NPPB) at 400 rpm for 6 seconds, followed by 900 rpm for 4 seconds. Next, each coated lens was placed in a forced air convection oven set at 65° C. for thirty minutes.

TABLE 6

Coatings applied to prepare coated articles

| Article Example | Coating Example |
|---|---|
| Ex-1 | B |
| Ex-2 | C |
| Ex-3 | D |
| CE-4 | A |
| CE-5 | E |

TABLE 6-continued

Coatings applied to prepare coated articles

| Article Example | Coating Example |
|---|---|
| CE-6 | F |
| CE-7 | G |
| CE-8 | H |
| CE-9 | I |
| CE-10 | J |
| CE-11 | K |

The coated lenses were cooled for two minutes. Using a conveyor system, the lenses were then passed through a nitrogen purged chamber fitted with a series of D Type and V Type bulbs positioned above glass windows on the top of the chamber. The glass windows had high transmissivity for ultraviolet and visible light. The energy density that each coating was exposed to was measured using a UV Power Puck™ II high energy radiometer (S/N:18938) from Uvitron International, Inc. as follows: UV-V of 13.0 J/cm², UV-A of 13.8 J/cm², UV-B of 0.6 J/cm², and UV-C of 0.1 J/cm².

Finally, a hard coat was applied to each lens using a spin coating process. Each lens was corona treated with a Power Generator HV 2000 (serial no. 020270) from Tantec EST Inc. set at 70 kV and 1000 W with a belt speed of 3 ft/min. Approximately 1.5 mL of hard coat was applied to a portion of the lens surface. The lens was spun using a spin processor from Laurell Technologies Corp. (WS-650-MZ-23NPPB) at 350 rpm for 4.3 seconds, followed by 1300 rpm for 1 second.

The lenses were placed in a forced air convection oven set to 105° C. for three hours.

Part 3: Measurements

Photochromic performance tests included absorption ratio, optical response measurements, and fatigue.

Prior to response testing on an optical bench, the test specimens were conditioned in a multistep custom built conditioning unit. First, they were exposed to 365 nanometer (nm) ultraviolet light for 10 minutes at a distance of about 10 centimeters (cm) from the source of electromagnetic radiation, in order to pre-activate the photochromic compounds. The Ultraviolet-A (UV-A) irradiance at the sample was measured to be 7.7 Watts per square meter (W/m²). Next, the test specimens were heated to and held at 70° F. (21.1° C.) for 10 minutes. Finally, the heating element was turned off and F17T8 Yellow Halogen lights were turned on for 30 minutes in order to bleach, or inactivate, the photochromic compounds in the test specimens. The illuminance from the yellow halogen lights at the test specimen was measured to be 9.0 Klux. The test specimens were then kept in a dark environment for at least 1 hour prior to testing in order to cool and continue to fade back to a ground state.

An optical bench was used to measure the optical properties of the test specimens and derive the absorption ratio and photochromic properties. Each test specimen was placed on the optical bench with an activating light source positioned at a 35 +/−1° angle of incidence to the surface of the test sample. The activating light source used was a Xenon Arc Lamp powered by a Newport/Oriel Model 69911 300-Watt power supply fitted with a UNIBLITZ® VS-25 high-speed computer controlled shutter that momentarily closed during data collection so that stray light would not interfere with the data collection process, a SCHOTT® 3 millimeter (mm) KG-2 heat absorbing filter, which removed short wavelength radiation, neutral density filter(s) for intensity attenuation, and a condensing lens for beam collimation. The arc lamp was equipped with a Digital Exposure Controller and sensor (Newport/Oriel model 68945) in order to maintain fine control of the output over time.

A broadband light source for monitoring response measurements was positioned in a perpendicular manner to the surface of the test specimen. Increased signal of shorter visible wavelengths was obtained by collecting and combining separately filtered light from a 100-Watt (W) tungsten halogen lamp (controlled by a LAMBDA® ZUP60-14 constant voltage power supply) with a split-end, bifurcated fiber optical cable. Light from one side of the tungsten halogen lamp was filtered with a SCHOTT® KG1 filter to absorb heat and a HOYA® B-440 filter to allow passage of the shorter wavelengths. The other side of the light was either filtered with a SCHOTT® KG1 filter or unfiltered. The light was collected by focusing light from each side of the lamp onto a separate end of the split-end, bifurcated fiber optic cable, and subsequently combined into one light source emerging from the single end of the cable. A 4 to 6 inch (10.2 to 15.25 cm) light pipe was attached to the single end of the cable to insure proper mixing. The broad band light source was fitted with a UNIBLITZ® VS-25 high-speed computer controlled shutter that momentarily opened during data collection.

Polarization of the light source was achieved by passing the light from the single end of the cable through a Moxtek, PROFLUX® Polarizer held in a computer driven (analyzer polarizer), motorized rotation stage (Model M-061. PD, M660, U651 or equivalent from Physik Instrumente). The monitoring beam was set so that the one polarization plane (0°) was perpendicular to the plane of the optical bench table and the second polarization plane (90°) was parallel to the plane of the optical bench table. The test specimens were run in air, at 23° C.±0.1° C. (which temperature was maintained by a temperature controlled air cell).

To align the test specimens, a second polarizer was added to the optical path (research grade film polarizer, such as, a polarizer from OptoSigma, SPF-50C-32). The second polarizer was set to 90° (+/−0.1 degrees) of the first analyzer polarizer. The sample was placed in an air cell in a self-centering holder mounted on a rotation stage (Model M-061. PD, M660, U651 or equivalent from Physik Instrumente). A laser beam (Coherent—ULN 635 diode laser) was directed through the crossed polarizers and sample. The signal intensity of the laser beam was measured, in relative counts, by the spectrophotometer. The test specimen was rotated 120 degrees in 3 degree increments in order to locate a minimum transmitted light intensity of the laser beam. The test specimen was then positioned near the minimum transmitted light intensity and then the test specimen was rotated 12 degrees in 0.1 degree steps in order to locate the minimum transmission to +/−0.1 degrees, depending upon the sample quality. The test specimen was then finally positioned at the minimum transmission angle. At this point the test specimen was aligned either parallel or perpendicular to the Moxtek analyzer polarizer. The second polarizer and the diode laser beam were removed from the optical path. Using this process, test specimens were aligned to ±0.1 degrees prior to any activation.

To conduct the measurements, each test specimen was exposed to roughly 6.7 W/m² of UV-A from the activating light source for 15 minutes to activate the photochromic compounds. An International Light Research Spectroradiometer (Model ILT950 or ILT950FC) was used to verify exposure at the beginning of each day. Light from the monitoring source that was polarized to the 0° polarization plane was then passed through the sample and focused into a 1 inch (2.54 cm) integrating sphere, which was connected to an OCEAN OPTICS® S2000 (or comparable) spectrophotometer using a single function fiber optic cable. The spectral information, after passing through the sample, was collected using OCEAN OPTICS Drivers in conjunction with propriety software from Transitions Optical, Ltd. While the photochromic material was activated, the position of the analyzer polarizer was rotated back and forth to polarize the light from the monitoring light source to the 90° polarization plane and back. Data was collected for approximately 900 seconds at 5 second intervals during activation. For each test, rotation of the polarizers was adjusted to collect data in the following sequence of polarization planes: 0°, 90°, 90°, 0°, etc.

Absorption spectra were obtained and analyzed for each test sample using the Igor Pro software (available from WaveMetrics). The change in the absorbance in each polarization direction for each test sample was calculated by subtracting out the 0 time (i.e., unactivated) absorption measurement for the samples at each wavelength tested. Average absorbance values were obtained in the region of the activation profile where the photochromic response of the photochromic compound was saturated or nearly saturated (i.e., the regions where the measured absorbance did not increase or did not increase significantly over time) for each sample by averaging absorbance at each time interval in this region. The average absorbance values in a predetermined range of wavelengths corresponding to $\lambda_{max-vis} \pm 5$ nm were extracted for the 0° and 90° polarizations, and the absorption ratio for each wavelength in this range was calculated by dividing the larger average absorbance by the small average absorbance. For each wavelength extracted, 5 to 100 data points were averaged. The average absorption ratio (AR) for the photochromic compound was then calculated by averaging these individual absorption ratios.

The change in optical density ($\Delta OD$) was determined by establishing the initial transmittance and then opening the shutter from the xenon lamp to provide ultraviolet radiation to change the test specimen from the bleached state to an activated state. Data was collected at selected intervals of time, measuring the transmittance in the activated state, and calculating the change in optical density according to the formula: $\Delta OD = \log(\% Tb/\% Ta)$, where % Tb is the percent transmittance in the bleached state, % Ta is the percent transmittance in the activated state, and the logarithm is to the base 10. Measurements were made at a weighted wavelength range corresponding to CIE Y, described in CIE Technical Report, Colorimetry, CIE 15:2018, with a D65 illuminant and 10° observer.

An Atlas Ci4000 Weather-Ometer was used for conducting the simulated solar radiation accelerated weathering, i.e., fatigue. The samples were exposed for a one hour dark cycle and then a 65 hour light cycle using a boro/borosilicate filtered Xenon arc lamp with an output of 0.25 Watts per square meter at 340 nm. The temperature in the Atlas Ci4000 Weather-Ometer during the light cycle was maintained at 45° C. and the relative humidity was controlled at 70% humidity. The temperature of the black panel which has a thermometer connected to it and is representative of the test samples was maintained at 55° C.

After the samples underwent this UV exposure fatigue cycle, they were preconditioned and measured on the optical bench to obtain the final photopic response ($\Delta OD_{final}$), under the same condition as described for the initial testing. The percent fatigue was determined by measuring the difference between the $\Delta OD$ of the test sample before and after accelerated weathering according to the formula: % Fatigue=$(\Delta OD_{init} - \Delta OD_{final})/\Delta OD_{init} \times 100$. The $\Delta b^*$ value was also determined. The $\Delta b^*$ value was the measured difference in the bleach state b* value as determined by the measured $b^*_{init}$ on the Hunter UltraScan Pro unit prior to exposure in the Atlas Ci4000 Weather-Ometer minus the measured $b^*_{final}$ value on the bleached state of the lens after this UV exposure fatigue cycle of 65 hours. The $\Delta b^*$ value represents the amount of yellowing of the lens that occurs during fatigue.

Finally, the $\Delta AR$ value was determined. The $\Delta AR$ value was measured as the difference between the measured $AR_{init}$ value prior to exposure in the Atlas Ci4000 WeatherOmeter minus the measured $AR_{final}$ value after this UV exposure fatigue cycle of hours. The $\Delta AR$ represents the amount of AR loss of the photochromic coating that occurs during fatigue.

The average optical density, the absorption ratio, along with percent fatigue, and $\Delta b^*$ for Example 1 and CE-4 through CE-8 are shown in Table 7. The average optical density, the absorption ratio, along with percent fatigue, $\Delta b^*$, and DAR for Examples 2 and 3 and CE-9 through CE-11 are shown in Table 8. All test results were an arithmetic average of duplicate tests.

TABLE 7

Combined effect of mesogenic HALS and mesogenic antioxidant

| Sample | Coating # | ΔOD | AR | % Fatigue (65 hr) | Δb* (65 hr) |
|---|---|---|---|---|---|
| Ex. 1 | B | 0.59 | 5.5 | 25.8 | 4.7 |
| CE-4 | A | 0.57 | 5.6 | 36.5 | 6.8 |
| CE-5 | E | 0.56 | 5.7 | 40.3 | 6.1 |
| CE-6 | F | 0.59 | 5.6 | 27.0 | 5.7 |
| CE-7 | G | 0.57 | 5.7 | 42.0 | 4.8 |
| CE-8 | H | 0.60 | 5.5 | 26.0 | 5.6 |

TABLE 8

Comparison of articles comprising mesogenic HALS, mesogenic antioxidants and UV light absorbers to articles comprising non-mesogenic HALS and non-mesogenic antioxidants

| Sample | Coating # | ΔOD | AR | % Fatigue (65 hr) | Δb* (65 hr) | ΔAR (65 hr) |
|---|---|---|---|---|---|---|
| Ex. 2 | C | 0.58 | 5.3 | 14.8 | 3.3 | 0.0 |
| Ex. 3 | D | 0.58 | 5.2 | 23.5 | 4.4 | 0.0 |
| CE-9 | I | 0.60 | 4.8 | 23.9 | 4.7 | −0.2 |
| CE-10 | J | 0.58 | 4.5 | 17.4 | 3.8 | −0.2 |
| CE-11 | K | 0.59 | 4.5 | 22.3 | 4.3 | −0.3 |

Part 4: Discussion

For the photochromic-dichroic lenses prepared, Table 7 shows that using a combination of a mesogenic HALS and mesogenic antioxidant at a specific molar ratio (Ex. 1), improves the % Fatigue and $\Delta b^*$ over using no stabilizers (CE-4), only HALS (CE-5), or only antioxidant (CE-6). Further, CE-7 and CE-8 suggest that the mesogenic HALS alone can reduce $\Delta b^*$ and the mesogenic antioxidant alone can reduce % Fatigue when using a molar ratio of 5 moles of stabilizer to 1 mole of photochromic-dichroic dyes (PCDDs). However, the reduction in both % Fatigue and $\Delta b^*$ is far greater when mesogenic HALS and mesogenic antioxidants are used in concert than is expected based on individual results of the mesogenic HALS and mesogenic antioxidant alone (Ex. 2).

Table 8 shows that UV light absorbers of multiple classes, specifically, benzotriazoles (Ex. 2) and benzophenones (Ex. 3) can be used to further enhance the fatigue resistance as shown by low % Fatigue and Δb* values while not significantly impacting the AR. Also, the use of two UVAs, namely, a benzotriazole and a benzophenone, with a non-mesogenic HALS and a non-mesogenic antioxidant in CE-10 and CE-11 respectively, shows that low pre-fatigued AR values are further reduced after a fatigue cycle when compared to Ex. 2 and Ex. 3 where mesogenic HALS and mesogenic antioxidants are used, as evidenced by negative ΔAR values. Further, Table 8 shows that the use of mesogenic stabilizers is necessary to ensure a high AR of the coating. In both examples using mesogenic stabilizers (Ex. 2 and Ex. 3), the AR is sufficiently greater than 5.0, whereas in CE-9-11, where non-mesogenic HALS and non-mesogenic antioxidants are used, the AR is less than 5.0.

These data suggest that a combination of mesogenic HALS and mesogenic antioxidant are necessary to sufficiently stabilize these photochromic-dichroic coatings. This combination outperforms either mesogenic HALS or mesogenic antioxidants alone. UVAs can be added to further stabilize the coatings.

Although the present invention has been described with reference to specific details of certain embodiments thereof, it is not intended that such details should be regarded as limitations upon the scope of the invention except insofar as they are included in the accompanying claims.

The invention claimed is:

1. A photochromic optical article comprising:
 an optical substrate; and
 an at least partial anisotropic layer disposed on the at least a portion of a surface of the substrate,
 wherein the at least partial anisotropic layer comprises:
 an anisotropic polymer;
 a photochromic-dichroic dye, a photochromic dye, or combinations thereof;
 a mesogenic hindered amine light stabilizer; and
 a mesogenic antioxidant,
 wherein the moles of the mesogenic antioxidant is present in an amount greater than the moles of the mesogenic hindered amine light stabilizer, wherein the mesogenic hindered amine light stabilizer is present in amount ranging from 10 mole percent (mol %) to 50 mol %, relative to the total moles of the photochromic-dichroic dye, and wherein the mesogenic antioxidant is present in an amount ranging from 25 mol % to 150 mol %, relative to the total moles of the photochromic-dichroic dye.

2. The photochromic optical article of claim 1, wherein the at least partial anisotropic layer further comprises an ultraviolet light absorber selected from the group consisting of benzotriazoles, benzophenones, and combinations thereof.

3. The photochromic optical article of claim 2, wherein the ultraviolet light absorber is a benzotriazole represented by the following Formula (VIII):

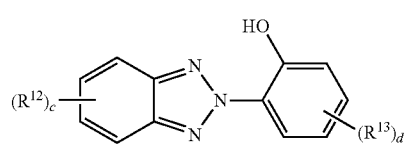

(VIII)

wherein $R^{12}$ for each c, and $R^{13}$ for each d are each independently methyl, ethyl, hydroxyl, or a halogen;

c is 0-4; and d is 0-4.

4. The photochromic optical article of claim 1, wherein the anisotropic polymer comprises polymerized liquid crystal monomers.

5. The photochromic optical article of claim 1, wherein the mesogenic hindered amine light stabilizer is a compound represented by the following Formula (I):

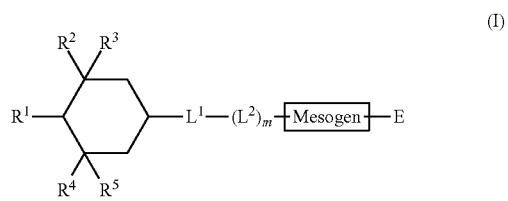

(I)

wherein $R^1$ is hydrogen, alkyl, alkoxy, acetyl, hydroxyl, or oxide, $R^2$, $R^3$, $R^4$, and $R^5$ are each independently hydrogen or alkyl, provided that two or more of $R^2$, $R^3$, $R^4$, and $R^5$ are alkyl, $L^1$ is a divalent linking group which is a divalent bond, or one of the following Formulas (IIa), (IIb), (IIc), (IId), (IIe), or (IIf),

(IIa)

(IIb)

wherein $R^6$ is a divalent alkyl or a divalent substituted alkyl,

(IIc)

(IId)

wherein $R^7$ is a divalent alkyl or a divalent substituted alkyl,

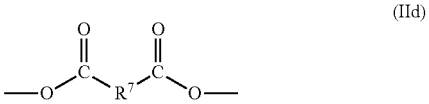

(IIe)

wherein $R^8$ is a divalent alkyl or divalent substituted alkyl, or

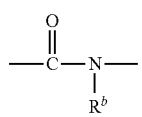
(IIf)

wherein $R^b$ is hydrogen, alkyl, or substituted alkyl, m is from 0 to 4, $L^2$ is, independently for each m, a divalent $C_1$-$C_{25}$ alkyl or a divalent $C_2$-$C_{25}$ alkenyl, in each case optionally interrupted with at least one of —O—, —C(O)—, —C(O)O—, or —OC(O)O—, the Mesogen is represented by the following Formula (III),

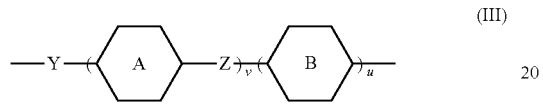
(III)

wherein Y is a divalent linking group which is a divalent bond, —O—, or —S—, v and u are each independently 0 to 4, provided that the sum of v and u is 2 to 4, Z is, independently for each v, a divalent linking group which is a divalent bond, —O—, —S—, —C(O)—, —C(O)O—, —OC(O)O—, —N($R^9$)—C(O)—O—, or —C(O)—N($R^9$)—, wherein $R^9$ is hydrogen, alkyl, or substituted alkyl, the divalent rings,

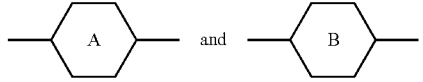

are each independently, for each v and each u, phenylen-1,4-diyl, or substituted phenylen-1,4-diyl, or cyclohexan-1,4-diyl, or substituted cyclohexan-1,4-diyl, and E is hydrogen, linear, or branched $C_1$-$C_{25}$ alkyl, linear or branched $C_2$-$C_{25}$ alkenyl, linear or branched $C_2$-$C_{25}$ alkynyl, each optionally interrupted with at least one of —O—, —S—, —C(O)—, —C(O)O—, or —OC(O)O—, provided that a direct $L^1$-$L^2$ link between $L^1$ and $L^2$ is free of two heteroatoms linked together, a direct $L^1$-Mesogen link between $L^1$ and Y is free of two heteroatoms linked together, and each direct $L^2$-Mesogen link between each directly linked $L^2$ and Y is free of two heteroatoms linked together.

6. The photochromic optical article of claim 5, wherein, $R^1$ is hydrogen, alkyl, or alkoxy;

$R^2$, $R^3$, $R^4$, and $R^5$ are each alkyl;

the sum of v and u is 3 to 4;

Z is, independently for each v, a divalent linking group which is a divalent bond or —C(O)O—; and E is alkyl.

7. The photochromic optical article of claim 5, wherein the mesogenic antioxidant is a compound represented by the following Formula (V):

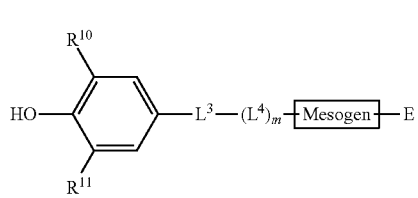
(V)

wherein $R^{10}$ and $R^{11}$ are each independently hydrogen or alkyl, provided that at least one of $R^{10}$ and $R^{11}$ is alkyl, $L^3$ is a divalent linking group which is a divalent bond, or one of the following Formulas (VIa), (VIb), (VIc), (VId), (VIe), or (VIf)

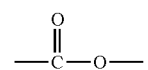
(VIa)

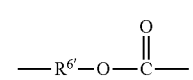
(VIb)

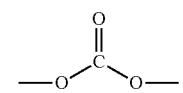
(VIc)

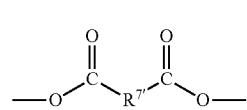
(VId)

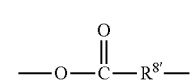
(VIe)

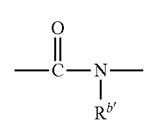
(VIf)

wherein $R^{6'}$, $R^{7'}$, $R^{8'}$, and $R^{b'}$ are each independently $R^6$, $R^7$, $R^8$, and $R^b$, respectively, m is from 0 to 4, $L^4$ is, independently for each m, divalent $C_1$-$C_{25}$ alkyl or divalent $C_2$-$C_{25}$ alkenyl, in each case optionally interrupted with at least one of —O—, —C(O)—, —C(O)O—, —OC(O)O—, the Mesogen is as represented in Formula III, and E is hydrogen, linear or branched $C_1$-$C_{25}$ alkyl, linear or branched $C_2$-$C_{25}$ alkenyl, linear or branched $C_2$-$C_{25}$ alkynyl, each optionally interrupted with at least one of —O—, —S—, —C(O)—, —C(O)O—, or —OC(O)O—;

provided that a direct $L^3$-$L^4$ link between $L^3$ and $L^4$ is free of two heteroatoms linked together, a direct $L^3$-Mesogen link between $L^3$ and Y is free of two heteroatoms linked together, and each direct $L^4$-mesogen link between each directly linked $L^4$ and Y is free of two heteroatoms linked together.

8. The photochromic optical article of claim 7, wherein $R^{10}$ and $R^{11}$ are each independently alkyl, provided that at least one of $R^{10}$ and $R^{11}$ is branched alkyl;

the sum of v and u is 3 to 4;

Z is, independently for each v, a divalent linking group which is divalent bond or —C(O)O—; and E is alkyl.

9. The photochromic optical article of claim 1, wherein the mesogenic antioxidant; the mesogenic hindered amine light stabilizer; and the photochromic-dichroic dye, the photochromic dye, or a combination thereof of the at least partial anisotropic layer is at least partially aligned.

10. The photochromic optical article of claim 9, wherein one or more layers are positioned between the substrate and the at least partial anisotropic layer, and/or
wherein one or more layers are positioned over at least a portion of the at least partial anisotropic layer.

11. The photochromic optical article of claim 10, wherein the one or more layers can further comprise fixed tint dyes, dichroic dyes, photochromic-dichroic dyes, photochromic dyes, or combinations thereof.

12. The photochromic optical article of claim 1, wherein the substrate comprises a polymeric material selected from the group consisting of polycarbonate, polycyclic alkene, polyurethane, poly(urea) urethane, polythiourethane, polythio(urea) urethane, polyol(allyl carbonate), cellulose acetate, cellulose diacetate, cellulose triacetate, cellulose acetate propionate, cellulose acetate butyrate, poly(vinyl acetate), poly(vinyl alcohol), poly(vinyl chloride), poly(vinylidene chloride), poly(ethylene terephthalate), polyester, polysulfone, polyolefin, copolymers thereof, and mixtures thereof.

13. The photochromic optical article of claim 1, wherein the article is an optical element selected from the group consisting of ophthalmic articles, display articles, windows, and mirrors.

14. The photochromic optical article of claim 13, wherein the optical element is an ophthalmic article selected from the group consisting of corrective lenses, non-corrective lenses, contact lenses, and protective lenses.

15. The photochromic optical article of claim 1, wherein the at least partial anisotropic layer comprises the photochromic-dichroic dye.

16. A photochromic coated article, wherein the coated article comprises:
a substrate; and
an anisotropic coating layer on at least a portion of a surface of the substrate,
wherein the anisotropic coating layer is formed from a polymerizable composition comprising:
a polymerizable anisotropic material;
a photochromic-dichroic dye, a photochromic dye, or combinations thereof;
a mesogenic hindered amine light stabilizer; and
a mesogenic antioxidant,
wherein the moles of the mesogenic antioxidant is present in an amount greater than the moles of the mesogenic hindered amine light stabilizer, wherein the mesogenic hindered amine light stabilizer is present in amount ranging from 10 mole percent (mol %) to 50 mol %, relative to the total moles of the photochromic-dichroic dye, and wherein the mesogenic antioxidant is present in an amount ranging from 25 mol % to 150 mol %, relative to the total moles of the photochromic-dichroic dye.

* * * * *